United States Patent
Fujio

(10) Patent No.: US 10,837,498 B2
(45) Date of Patent: Nov. 17, 2020

(54) FIXED CONSTANT VELOCITY UNIVERSAL JOINT

(71) Applicant: NTN CORPORATION, Osaka (JP)

(72) Inventor: Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 359 days.

(21) Appl. No.: 15/761,594

(22) PCT Filed: Sep. 7, 2016

(86) PCT No.: PCT/JP2016/076291
§ 371 (c)(1),
(2) Date: Mar. 20, 2018

(87) PCT Pub. No.: WO2017/051710
PCT Pub. Date: Mar. 30, 2017

(65) Prior Publication Data
US 2018/0347636 A1    Dec. 6, 2018

(30) Foreign Application Priority Data

Sep. 24, 2015   (JP) .................................. 2015-187268

(51) Int. Cl.
*F16D 3/224*    (2011.01)
*F16D 3/2245*   (2011.01)
(Continued)

(52) U.S. Cl.
CPC .......... *F16D 3/224* (2013.01); *F16D 3/2245* (2013.01); *F16D 3/2265* (2013.01); *F16D 2003/22309* (2013.01); *Y10S 464/906* (2013.01)

(58) Field of Classification Search
CPC ...... F16D 3/224; F16D 3/2245; F16D 3/2265; F16D 2003/22309; Y10S 464/906
(Continued)

(56) References Cited

U.S. PATENT DOCUMENTS

| | | | |
|---|---|---|---|
| 8,979,659 B2* | 3/2015 | Fujio | F16D 3/224 |
| | | | 464/144 |
| 2010/0209202 A1 | 8/2010 | Scherbarth | |

(Continued)

FOREIGN PATENT DOCUMENTS

| | | |
|---|---|---|
| DE | 10 2006 058 860 | 7/2008 |
| DE | 10 2007 056 371 | 5/2009 |

(Continued)

OTHER PUBLICATIONS

International Search Report (ISR) dated Nov. 22, 2016 in International (PCT) Application No. PCT/JP2016/076291.

(Continued)

*Primary Examiner* — Greg Binda
(74) *Attorney, Agent, or Firm* — Wenderoth, Lind & Ponack, L.L.P.

(57) ABSTRACT

In a fixed type constant velocity universal joint according to the present invention, six torque transmitting ball tracks (20) are defined as a first track, a second track, a third track, a fourth track, a fifth track, and a sixth track along a circumferential direction. Further, in the fixed type constant velocity universal joint according to the present invention, an axial offset amount of a curvature center of each of track grooves (12) of an outer joint member (13) and an axial offset amount of a curvature center of each of track grooves (15) of an inner joint member (16) are set to 0. Further, in the fixed type constant velocity universal joint according to the present invention, the track grooves (12) of the outer joint member (13) and the track grooves (15) of the inner joint member (16) are each inclined with respect to an axis line.

14 Claims, 20 Drawing Sheets

(51) Int. Cl.
*F16D 3/226* (2006.01)
*F16D 3/223* (2011.01)

(58) Field of Classification Search
USPC .......................................................... 464/144
See application file for complete search history.

(56) References Cited

U.S. PATENT DOCUMENTS

| | | |
|---|---|---|
| 2010/0292016 A1 | 11/2010 | Wormsbaecher et al. |
| 2016/0252137 A1 | 9/2016 | Hirukawa et al. |
| 2017/0138407 A1 | 5/2017 | Lohmberg et al. |

FOREIGN PATENT DOCUMENTS

| | | |
|---|---|---|
| JP | 2009-250365 | 10/2009 |
| JP | 5101430 | 12/2012 |
| JP | 2013-11338 | 1/2013 |
| JP | 2013-11339 | 1/2013 |
| JP | 5138449 | 2/2013 |
| WO | 2015/068536 | 5/2015 |
| WO | 2015/197205 | 12/2015 |

OTHER PUBLICATIONS

International Preliminary Report on Patentability dated Mar. 27, 2018 in International (PCT) Application No. PCT/JP2016/076291.
Extended European Search Report dated Mar. 25, 2019 in corresponding European Patent Application No. 16848498.8.

* cited by examiner

EXAMPLE OF ○

EXAMPLE OF ×

EXAMPLE OF △

FIXED CONSTANT VELOCITY UNIVERSAL JOINT

TECHNICAL FIELD

The present invention relates to a fixed type constant velocity universal joint, which is to be applied to automobiles and various other industrial machines.

BACKGROUND ART

As fixed type constant velocity universal joints, there are given a Barfield type (BJ), an undercut-free type (UJ), and the like. Further, in recent years, there are also given a BJ and a UJ of an eight-ball type, which are reduced in weight and size, and various fixed type constant velocity universal joints are selectively used depending on a purpose.

In order to further enhance a performance, as fixed type constant velocity universal joints, there have been proposed various constant velocity universal joints of a track crossing type, in which contact of a cage with an outer spherical surface and an inner spherical surface is reduced with an aim to achieve reduction in heat generation (Patent Literature 1 to Patent Literature 4).

The constant velocity universal joint of the track crossing type includes, for example, as illustrated in FIG. 20 and FIG. 21, an outer joint member 3, an inner joint member 6, a plurality of (six) balls 7, and a cage 8. The outer joint member 3 has a plurality of (six) track grooves 2 formed in an inner spherical surface 1 thereof. The inner joint member 6 has a plurality of (six) track grooves which are paired with the track grooves 2 of the outer joint member 3, formed in an outer spherical surface 4 thereof. The plurality of (six) balls 7 are interposed between the track grooves 2 of the outer joint member 3 and the track grooves 5 of the inner joint member 6, and are configured to transmit torque. The cage 8 is interposed between the inner spherical surface 1 of the outer joint member 3 and the outer spherical surface 4 of the inner joint member 6, and is configured to retain the balls 7.

Axial offset amounts of a curvature center O1 of the track groove 2 of the outer joint member 3 and a curvature center O2 of the track groove 5 of the inner joint member 6 are set to 0. That is, the curvature center O1 and the curvature center O2 match with a joint center O. The track groove 2 of the outer joint member 3 and the track groove 5 of the inner joint member 6, which is opposed thereto, form a torque transmitting ball track 10.

As illustrated in FIG. 22 to FIG. 24, in the outer joint member 3, each of the track grooves 2 is inclined with respect to the axial direction. In this case, the track grooves 2 adjacent to each other in a circumferential direction are inclined in direction opposite to each other. That is, when a track groove 2A is inclined with respect to an axis line L by an angle γ in a clockwise direction from a far side to an opening side, a track groove 2B adjacent to this track groove 2A in the clockwise direction is inclined with respect to the axis line L by γ a counterclockwise direction from the far side to the opening side.

Further, as illustrated in FIG. 25 to FIG. 27, in the inner joint member 6, each of the track grooves 5 is inclined with respect to the axial direction. In this case, the track grooves 5 adjacent to each other in the circumferential direction are inclined in directions opposite to each other. That is, when a track groove 5A is inclined with respect to an axis line L1 by an angle γ (the same angle as that of the track groove 2 of the outer joint member 3) in the counterclockwise direction from the far side to the opening side, a track groove 5B adjacent to this track groove 5A in the clockwise direction is inclined with respect to the axis line 11 by γ in the clockwise direction from the far side to the opening side.

In this manner, in the outer joint member 3, the track grooves 2 inclined in the clockwise direction and the track grooves 2 inclined in the counterclockwise direction are arrayed alternately along the circumferential direction. Further, in the inner joint member 6, the track grooves 5 inclined in the counterclockwise direction and the track grooves 5 inclined in the clockwise direction are arrayed alternately along the circumferential direction. Moreover, the track groove 2 of the outer joint member 3, which is inclined in the clockwise direction, and the track groove 5 of the inner joint member 6, which is inclined in the counterclockwise direction, correspond to each other. The track groove 2 of the outer joint member 3, which is inclined in the counterclockwise direction, and the track groove 5 of the inner joint member 6, which is inclined in the clockwise direction, correspond to each other.

Therefore, as the torque transmitting ball tracks 10, there are provided a P type and an M type depending on the inclination directions of the track grooves 2 and 5 as illustrated in FIG. 21. In the P type, the track groove 2 is the track groove 2B, and the track groove 5 is the track groove 5B. In the M type, the track groove 2 is the track groove 2A, and the track groove 5 is the track groove 5A.

As illustrated in FIG. 28 and FIG. 29, the cage 8 is an annular member, and a plurality of pockets 9 configured to accommodate the balls 7 are arrayed in a peripheral wall of the cage 8 along the circumferential direction. In this case, circumferential lengths W of the pockets 9 are the same, and a pillar width of a pillar portion 8c (between the pockets adjacent to each other in the circumferential direction) is relatively small. Further, a curvature center of an outer spherical surface 8a and a curvature center of an inner spherical surface 8b match with each other. In this case, the circumferential lengths W of the pockets 9 are the same.

Using the fixed type constant velocity universal joint of the track crossing type as described above is becoming an effective measure for meeting environmental performance required for automobiles in recent years. Further, the fixed type constant velocity universal joint of the track crossing type is small in heat generation, and hence can exert performance not only in a drive shaft, but also in a propeller shaft configured to transmit rotational power from a transmission to a differential in a four-wheel drive vehicle (4 WD vehicle) or a rear-wheel drive vehicle (FR vehicle).

CITATION LIST

Patent Literature 1: JP 5138449 B2
Patent Literature 2: JP 5101430 B2
Patent Literature 3: JP 2013-11338 A
Patent Literature 4: JP 2013-11339 A

SUMMARY OF INVENTION

Technical Problem

Among such types, a type in which the number of torque transmission balls is six has advantages in that the number of components is small, that processability is satisfactory, that assembly efficiency is satisfactory, and that the ball size can be increased (large load capacity can be secured). However, there is a problem in that operability is significantly degraded depending on a crossing angle or a contact state (contact angle or contact ratio) of the ball.

In a constant velocity universal joint of a ball type, the cage is held by an angle at which tracks of outer and inner joint members sandwich the ball (wedge angle), and then, the constant velocity universal joint is operated. As illustrated in FIG. 31, the wedge angles vary depending on an operating angle of the joint and during one rotation. When the joint forms a large operating angle, wedges for receiving the balls in respective phases vary and become "+" or "−". However, the position is determined by the cage. The track grooves adjacent to each other are mirror symmetrical with each other, and the wedge angles are directed to sides opposite to each other.

It was found that the constant velocity universal joint of the six-ball track crossing type involves no track offset and has the wedge angle determined based on the crossing angle of the track, the contact angle, and the operating angle, and a force by a wedge acts to rotate the cage in a certain operating angle range. With this, the cage becomes unstable to cause contact of the cage with the outer spherical surface or contact of the cage with the inner spherical surface occurs, with the result that there arises a problem of increase in torque loss and abnormal heat generation of the joint. The wedge angle is represented by $(n-\alpha')=\alpha$ (narrow angle side) when, as illustrated in FIG. 20, a contact point between the ball 7 and the track groove 5 of the inner joint member 6 is defined as A, a contact point between the ball 7 and the track groove 2 of the outer joint member 3 is defined as B, a ball center point is defined as C, and an angle formed between a straight line AC and a straight line BC is defined as $\alpha'$. In FIG. 20, illustration is made in a two-dimensional plane, and hence the wedge angle is seen as being 0. However, in actuality, the wedge angle is formed by the crossing angle.

In FIG. 31, there are shown relationships between phase angles and wedge angles of the six tracks 10 (a first track 10A, a second track 10B, a third track 10C, a fourth track 10D, a fifth track 10E, and a sixth track 10F). In this case, the crossing angle γ is set to 6 degrees, and the operating angle is set to 12 degrees.

In FIG. 32, "+" and "−" of the wedge angles in the "d" part in FIG. 31 are illustrated. In this case, the first track 10A and the fourth track 10D are "0", the second track 10B and the sixth track 10F are "−", and the third track 10C and the fifth track 10E are "+".

Therefore, in the "d" part in FIG. 31, as illustrated in FIG. 32, "+" and "−" are arrayed to be symmetric with respect to an axis X. As described above, the wedge angles become "+" and "−" in the symmetric state, and thus a rotational force is applied to the cage, with the result that the constant velocity universal joint becomes unstable.

Further, in FIG. 33, there are shown relationships between phase angles and wedge angles when the crossing angle γ is set to 6 degrees and the operating angle is set to 24 degrees. Further, in FIG. 34A, "+" and "−" of the wedge angles in the "a" part in FIG. 33 are illustrated. In FIG. 34B, "+" and "−" of the wedge angles in the "b" part in FIG. 33 are illustrated. In FIG. 34C, "+" and "−" of the wedge angles in the "c" part in FIG. 33 are illustrated.

In the "a" part, the first track 10A, the fifth track 10E, and the sixth track 10F are "+", and the second track 10B, the third track 10C, and the fourth track 10D are "−". In the "b" part, the first track 10A, the third track 10C, the fourth track 10D, and the sixth track 10F are "0", the second track 10B is "−", and the fifth track 10E is "+". In the "c" part, the first track 10A, the second track 10B, and the sixth track 10F are "−", and the third track 10C, the fourth track 10D, and the fifth track 10E are "+".

Therefore, in the "a" part in FIG. 33, as illustrated in FIG. 34A, "+" and "−" are arrayed to be symmetric with respect to an axis X1. In the "b" part in FIG. 33, as illustrated in FIG. 34B, "+" and "−" are arrayed to be symmetric with respect to an axis X2. In the "c" part in FIG. 33, as illustrated in FIG. 34C, "+" and "−" are arrayed to be symmetric with respect to the axis X.

When, as illustrated in FIG. 33, the operating angle is secured to be larger than that illustrated in FIG. 31 as described above, the cage continuously receives the rotational force, with the result that the function as the constant velocity universal joint is not exerted.

Incidentally, the wedge angles during one rotation vary depending on the crossing angle and the contact angle. However, as illustrated in FIG. 35, when the contact angle is changed while the crossing angle is set to be constant, phases at which the wedge angles become 0 are not changed. Therefore, the above-mentioned problem cannot be solved. Further, as illustrated in FIG. 36, when the crossing angle is increased, the wedge angle is not reversed (±). Therefore, through restriction of the crossing angle, an initial operating angle that may lead to the above-mentioned problem can be delayed.

Next, in Table 1, there is shown a relationship between the operating angle and the crossing angle in the above-mentioned fined type constant velocity universal joint of a six-ball crossing type illustrated in FIG. 20. As understood from Table 1, when the adjacent crossing angles are the same, the balance of the cage is kept by increasing the crossing angles. In this manner, the constant velocity universal joint can be used as it is. However, when the crossing angle is secured to be larger, a spherical surface width F2 (see FIG. 26) on a side on which the tracks of the inner joint member and the outer joint member are arranged close to each other is reduced, with the result that the structure is not established. In consideration of the size of the constant velocity universal joint, the crossing angle γ can only be increased to up to about 17°.

TABLE 1

| | Operating angle | | | | | | | | | |
|---|---|---|---|---|---|---|---|---|---|---|
| Crossing angle | 2 | 4 | 6 | 8 | 10 | 12 | 14 | 16 | 18 | 20 |
| 4 | ○ | ○ | ○ | Δ | x | x | x | x | x | x |
| 6 | ○ | ○ | ○ | ○ | ○ | Δ | x | x | x | x |
| 8 | ○ | ○ | ○ | ○ | ○ | ○ | ○ | Δ | x | x |
| 10 | ○ | ○ | ○ | ○ | ○ | ○ | ○ | ○ | ○ | Δ |
| 12 | ○ | ○ | ○ | ○ | ○ | ○ | ○ | ○ | ○ | ○ |
| 14 | ○ | ○ | ○ | ○ | ○ | ○ | ○ | ○ | ○ | ○ |
| 16 | ○ | ○ | ○ | ○ | ○ | ○ | ○ | ○ | ○ | ○ |

○: Reverse of the cage does not occur.
Δ: Reverse of the cage is beginning to occur.
x: Reverse occurs in any phase angle.

FIG. 37A is a graph for showing relationships between the wedge angles and the phase angles, in which reverse of the cage does not occur. FIG. 37B is a graph for showing relationships between the wedge angles and the phase angles, in which reverse of the cage is beginning to occur. FIG. 37C is a graph for showing relationships between the wedge angles and the phase angles, in which reverse occurs in any phase angle.

In view of the above-mentioned problem, the present invention provides a fixed type constant velocity universal joint of a six-ball track crossing type, which is not in a completely balanced state, but is capable of reducing contact with spherical surfaces as much as possible, and is not degraded in operability in an applied operating angle range.

Solution to Problem

According to one embodiment of the present invention, there is provided a fixed type constant velocity universal joint, comprising: an outer joint member having a plurality of track grooves formed in an inner spherical surface thereof; an inner joint member having a plurality of track grooves, which are paired with the track grooves of the outer joint member, formed in an outer spherical surface thereof; a plurality of torque transmission balls, which are arrayed in a plurality of torque transmitting ball tracks that are formed in cooperation with the track grooves of the outer joint member and the track grooves of the inner joint member corresponding to the track grooves of the outer joint member; and a cage, which is interposed between the inner spherical surface of the outer joint member and the outer spherical surface of the inner joint member, and is configured to retain the plurality of torque transmission balls, in which the plurality of torque transmitting ball tracks comprise six torque transmitting ball tracks, which are defined as a first track, a second track, a third track, a fourth track, a fifth track, and a sixth track along a circumferential direction, in which an axial offset amount of a curvature center of each of the plurality of track grooves of the outer joint member and an axial offset amount of a curvature center of each of the plurality of track grooves of the inner joint member are set to 0, in which the plurality of track grooves of the outer joint member and the plurality of track grooves of the inner joint member are each inclined with respect to an axis line, and in which, in each of the plurality of torque transmitting ball tracks, the each of the plurality of track grooves of the outer joint member and the each of the plurality of track grooves of the inner joint member, which are opposed to the plurality of track grooves of the outer joint member, are inclined with respect to the axis line in opposite directions so that inclination angles of the plurality of torque transmitting ball tracks adjacent to each other in the circumferential direction are set to be different from each other.

With the fixed type constant velocity universal joint according to the present invention, the track grooves of the outer joint member and the track grooves of the inner joint member, which are opposed thereto, are inclined with respect to the axis line in the opposite directions, and the inclination angles of the torque transmitting ball tracks, which are adjacent to each other in the circumferential direction, are set to be different from each other. Thus, a spherical surface width on a side of the inner joint member on which the track grooves are closely adjacent to each other (a width dimension of a part of the outer spherical surface, which is located between the track, grooves adjacent to each other in the circumferential direction) can be secured to be larger. Further, a maximum movement amount of the ball differs among the pockets of the cage, which are adjacent to each other in the circumferential direction. Thus, the circumferential length of the pillar portion between the pockets adjacent to each other in the circumferential direction can be secured to be larger than in the case in which the inclination angles of the torque transmitting ball tracks, which are adjacent to each other in the circumferential direction, are the same.

It is preferred that, when crossing angles being inclination angles of the first track, the third track, and the fifth track are set to be the same and are each defined as $\gamma 1$, and crossing angles being inclination angles of the second track, the fourth track, and the sixth track are set to be the same and are each defined as $\gamma 2$, a relationship of $\gamma 1 > \gamma 2$ be satisfied.

Further, it is preferred that the crossing angle $\gamma 1$ of each of the first track, the third track, and the fifth track be set to satisfy a relationship of $8° \leq \gamma 1 \leq 20°$. Still further, it is preferred that the crossing angle $\gamma 1$ of the each of the first track, the third track, and the fifth track, and the crossing angle of each of the second track, the fourth track, and the sixth track be set to satisfy a relationship of $4° \leq \gamma 2 \leq \gamma 1$.

Each of the plurality of torque transmitting balls and the each of the plurality of track grooves may be held in angular contact with each other at a contact angle of from 30° to 45°.

The curvature center of the each of the plurality of track grooves of the outer joint member may be offset with respect to a curvature center of the inner spherical surface of the outer joint member in a radial direction. The curvature center of the each of the plurality of track grooves of the inner joint member maybe offset with respect to a curvature center of the outer spherical surface of the inner joint member in the radial direction.

Advantageous Effects of Invention

In the present invention, the spherical surface width on the side of the inner joint member on which the track grooves are closely adjacent to each other can be secured to be larger. Therefore, both of enhancement in strength and reduction in weight and size can be attained. Further, the circumferential length of the pillar portion (pillar width) of the cage can be secured to be larger. Thus, the cage strength can be enhanced.

The ball and each of the track grooves are held in angular contact with each other at a contact angle of from 30° to 45°. Thus, the ball can be prevented from riding on a track groove edge portion when high torque is input so that sliding amounts of the ball and the track grooves can be reduced, thereby being capable of bringing the contact pressure into a satisfactory range.

The track center is offset in the radial direction so that groove depths of the track grooves can be varied. Therefore, there can be obtained a structure capable of preventing the balls from dropping off the track grooves, or a structure capable of enhancing the stiffness of the outer joint member and the inner joint member.

DESCRIPTION OF EMBODIMENTS

Figure 1:
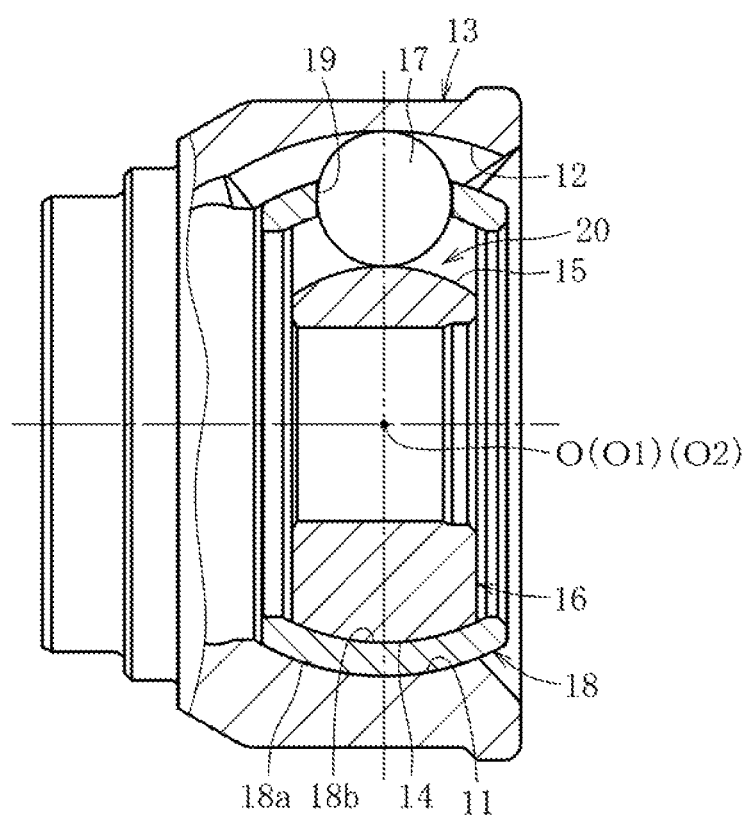
FIG. 1 is a sectional view of a constant velocity universal joint according to one embodiment of the present invention.
Figure 2:
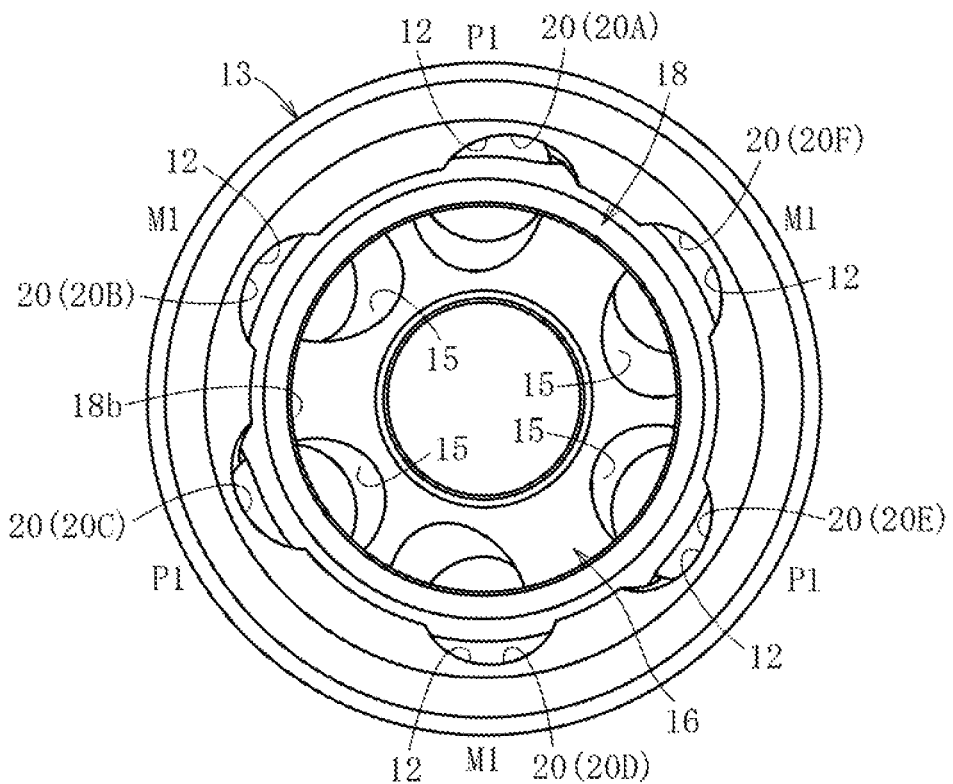
FIG. 2 is a front view of the constant velocity universal joint in FIG. 1.

Now, an embodiment of the present invention is described with reference to FIG. 1 to FIG. 19. A fixed type constant velocity universal joint according to the embodiment is illustrated in FIG. 1 and FIG. 2. The fixed type constant velocity universal joint comprises an outer joint member 13, an inner joint member 16, six balls 17, and a cage 18. The outer joint member 13 has six track grooves 12 formed, in an inner spherical surface 11 thereof. The inner joint member 16 has six track grooves 15, which are paired with the track grooves 12 of the outer joint member 13, formed in an outer spherical surface 14 thereof. The six balls 17 are interposed between the track grooves 12 of the outer joint member 13 and the track grooves 15 of the inner joint member 16, and are configured to transmit torque. The cage 18 is interposed between the inner spherical surface 11 of the outer joint member 13 and the outer spherical surface 14 of the inner joint member 16, and is configured to retain the balls 17.

Axial offset amounts of a curvature center O1 of the track groove 12 of the outer joint member 13 and a curvature center O2 of the track groove 15 of the inner joint member 16 are set to 0. That is, the curvature center O1 and the curvature center O2 match with a joint center O.

Figure 4:
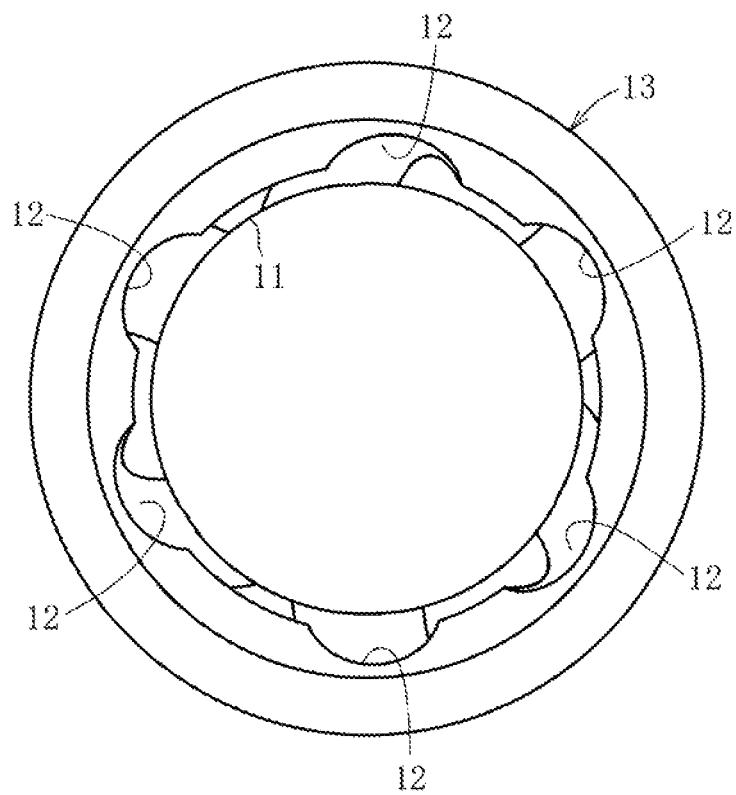
FIG. 4 is a front view of an outer joint member of the constant velocity universal joint in FIG. 1.
Figure 5:
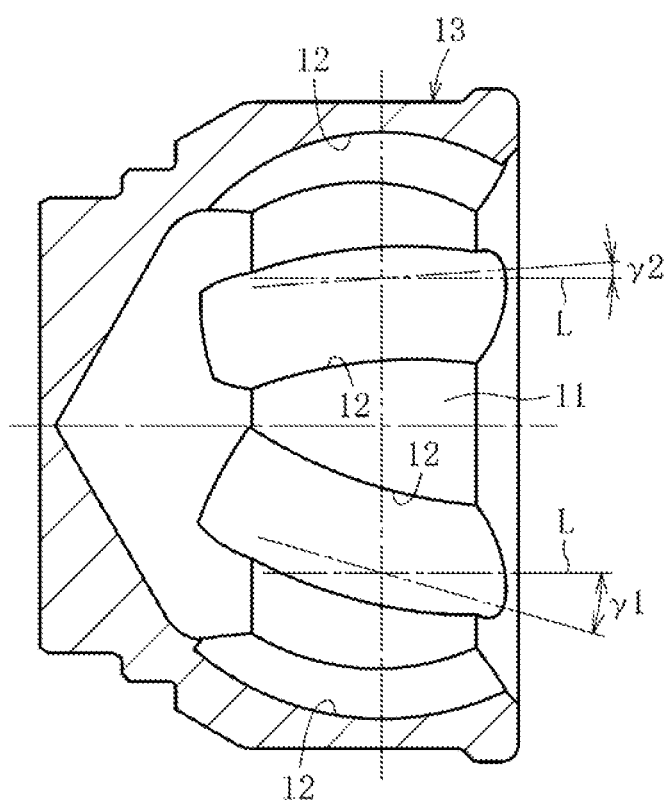
FIG. 5 is a sectional view of the outer joint member of the constant velocity universal joint in FIG. 1.
Figure 6:
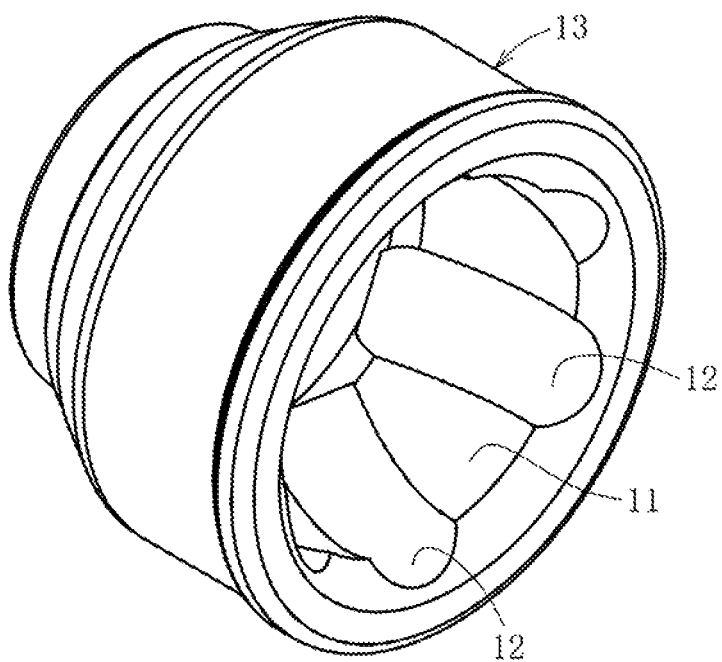
FIG. 6 is a perspective view of the outer joint member of the constant velocity universal joint in FIG. 1.

As illustrated in FIG. 4 to FIG. 6, in the outer joint member 13, each of the track grooves 12 is inclined with respect to the axial direction. FIG. 4 is a front view of the outer joint member 13 of the fixed type constant velocity universal joint, illustrated in FIG. 1. FIG. 5 is a sectional view of the outer joint member 13. FIG. 6 is a perspective view of the outer joint member 13. In this case, as illustrated in FIG. 5, the track grooves 12 comprise track grooves 12 inclined with respect to an axis line L by an angle γ1 in a clockwise direction from a far side to an opening side, and track grooves 12 inclined with respect to the axis line L by an angle γ2 in a counterclockwise direction from the far side to the opening side.

Figure 7:
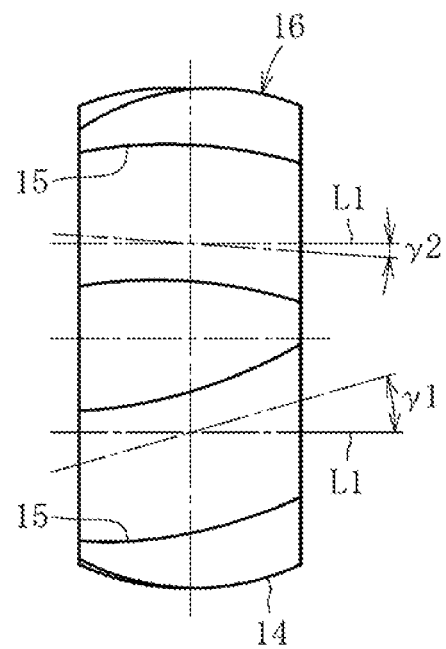
FIG. 7 is a side view of an inner joint member of the constant velocity universal joint in FIG. 1.
Figure 8:
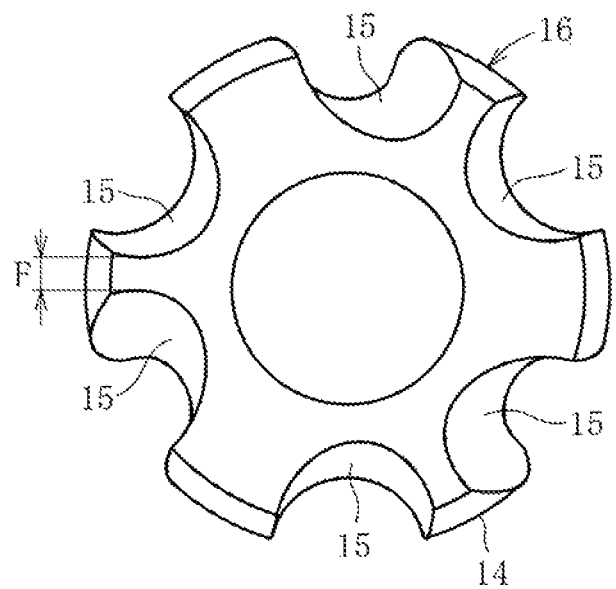
FIG. 8 is a front view of the inner joint member of the constant velocity universal joint in FIG. 1.
Figure 9:
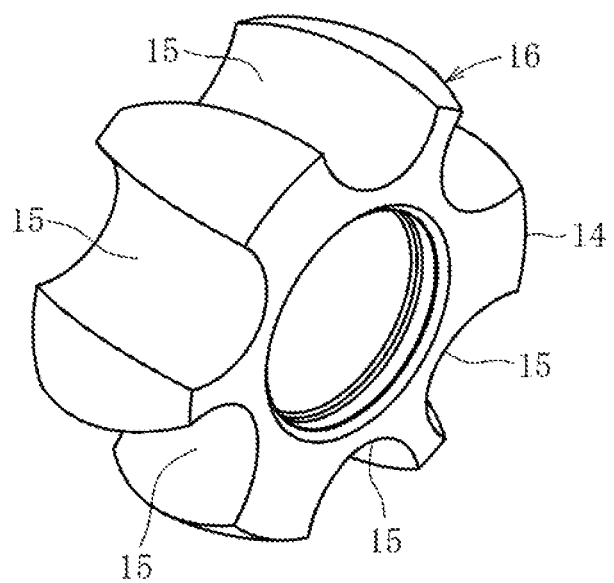
FIG. 9 is a perspective view of the inner joint member of the constant velocity universal joint in FIG. 1.
Figure 10:
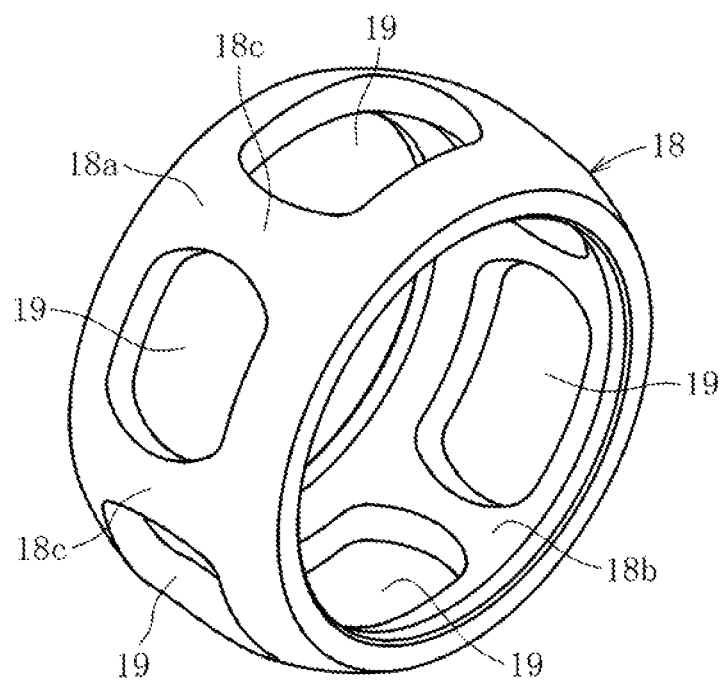
FIG. 10 is a perspective view of a cage of the constant velocity universal joint in FIG. 1.
Figure 11:
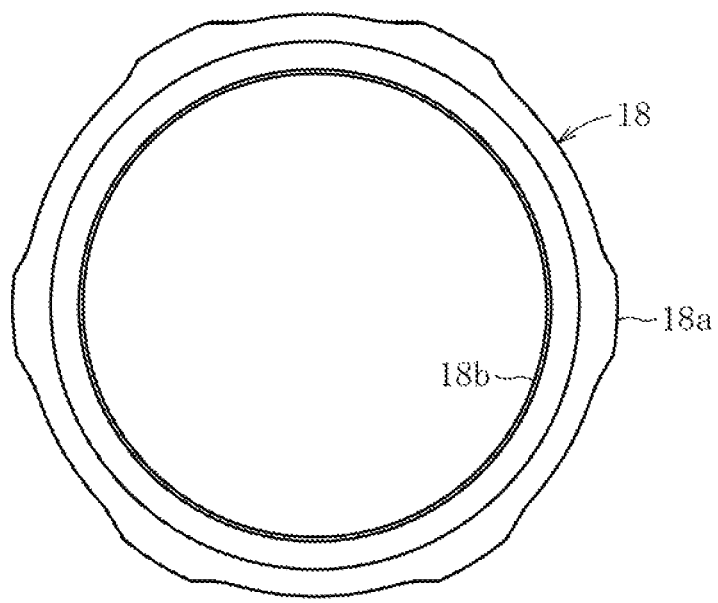
FIG. 11 is a front view of the cage of the constant velocity universal joint in FIG. 1.
Figure 12:
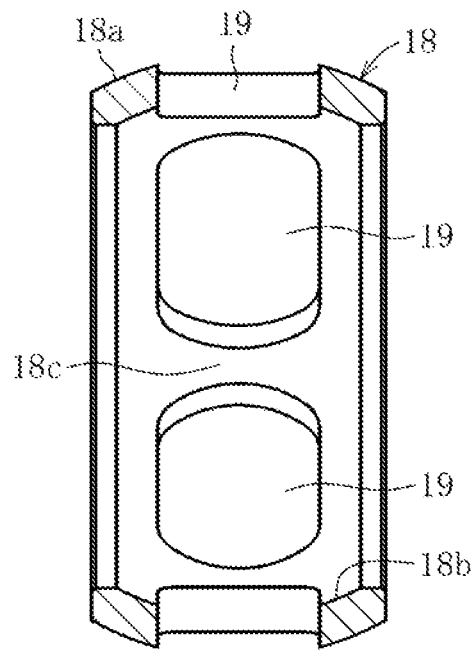
FIG. 12 is a longitudinal sectional view of the cage of the constant velocity universal joint in FIG. 1.

Further, as illustrated in FIG. 7 to FIG. 9, in the inner joint member 16, each of the track grooves 15 is inclined with respect to the axial direction. In this case, as illustrated in FIG. 7, the track grooves 15 comprise track grooves 15 inclined with, respect to an axis line L1 by an angle γ1 in the counterclockwise direction from the far side to the opening side, and track grooves 12 inclined with respect, to the axis line L1 by an angle γ2 in the clockwise direction from, the far side to the opening side.

As illustrated in FIG. 1 and FIG. 2, the track groove 12 of the outer joint member 13 and the track groove 15 of the inner joint member 16, which is opposed thereto, construct one torque transmitting ball track 20. Therefore, in this embodiment, six torque transmitting ball tracks 20 are formed. Further, in each of the torque transmitting ball tracks 20, the track groove 12 of the outer joint member 13 and the track groove 15 of the inner joint member 16, which is opposed thereto, are inclined in opposite directions with respect to the axis line.

Further, regarding the inclination directions of the track grooves 12 and 15 of the torque transmitting ball tracks 20, as illustrated in FIG. 2, three ball tracks 20, specifically, a first ball track 20A, a third ball track 20C, and a fifth ball track 20E are defined as a P1 type, and the other three ball tracks 20, specifically, a second ball track 20B, a fourth ball tracks 20D, and a sixth ball track 20F are defined as a M1 type.

As the ball track of the P1 type, the track groove 12 of the outer joint member 13 is inclined with respect to the axis line L by γ1 (see FIG. 5) in the clockwise direction from the far side to the opening side, and the track groove 15 of the inner joint member 16 is inclined with respect to the axis line L1 by γ1 (see FIG. 7) in the counterclockwise direction from the far side to the opening side. Further, as the ball track of the M1 type, the track groove 12 of the outer joint member 13 is inclined with respect to the axis line L by γ2 (see FIG. 5) in the counterclockwise direction from the far side to the opening side, and the track groove 15 of the inner joint member 16 is inclined with respect to the axis line L1 by γ1 (see FIG. 7) in the clockwise direction from the far side to the opening side. For clear understanding, in FIG. 2, the P1 type or the M1 type is indicated at each of the track grooves 12 of the outer joint member 13 and each of the track grooves 15 of the inner joint member 16.

Therefore, the track grooves 12 of the first ball track 20A, the third ball track 20C, and the fifth ball track 20E are inclined in the same direction, and the track grooves 15 of the first ball track 20A, the third ball track 20C, and the fifth ball track 20F are inclined in the same direction. The track grooves 12 of the second ball track 20B, the fourth ball track 20D, and the sixth ball track 20F are inclined in the same direction, and the track grooves 15 of the second ball track 20B, the fourth ball track 20D, and the sixth ball track 20F are inclined in the same direction.

Incidentally, inclination angles (crossing angles γ1) of the track grooves 12 and 15 of the ball tracks 20, specifically, the first ball track 20A, the third ball track 20G, and the fifth ball track 20E are set to be the same. Further, inclination angles (crossing angles γ2) of the track grooves 12 and 15 of the ball tracks 20, specifically, the f second ball track 20B, the fourth ball track 20D, and the sixth ball track 20E are set to be the same. Further, a relationship of γ1>γ2 is set to be satisfied. It is preferred that γ1 be set to satisfy a relationship of $8° \leq γ1 \leq 20°$, and that a relationship of $4° \leq γ2 \leq γ1$ be satisfied.

Figure 3:
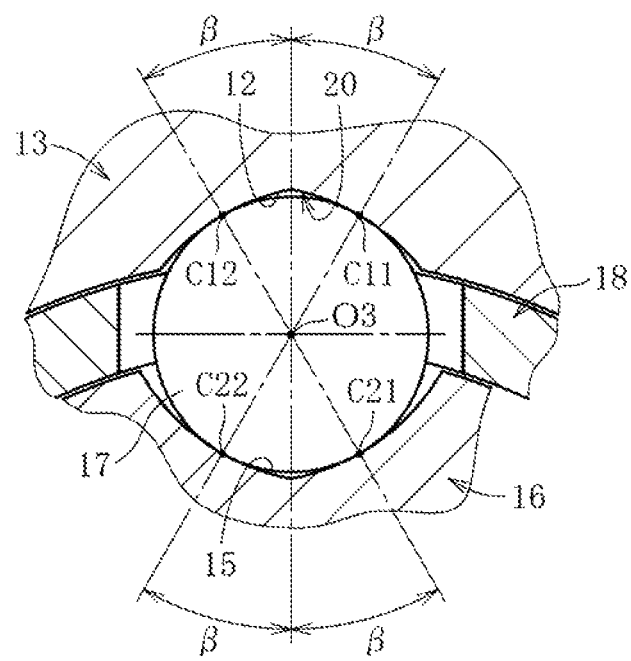
FIG. 3 is a main-part enlarged sectional view of the constant velocity universal joint in FIG. 1, for illustrating contact angles.

Further, as illustrated in FIG. 3, each of the track grooves 12 and 15 of each of the ball tracks 20 is formed into a Gothic arch shape. Therefore, the ball 11 is held in contact (angular contact) with the track groove 12 of the outer joint member 13 at two points of C11 and C12, and is held in contact (angular contact) with the track groove 15 of the inner joint member 16 at two points of C21 and C22.

Angles β formed between straight lines passing through a ball center $O_3$ and the respective contact points C11, C12, C21, and C22 and a straight line passing through the ball center $O_3$ and the joint center O are contact angles. All of the contact angles β of the respective contact points C11, C12, C21, and C22 are the same. A lower limit value of the contact angle β is set to 30°, and an upper limit value thereof is set to 45°.

Figure 13:
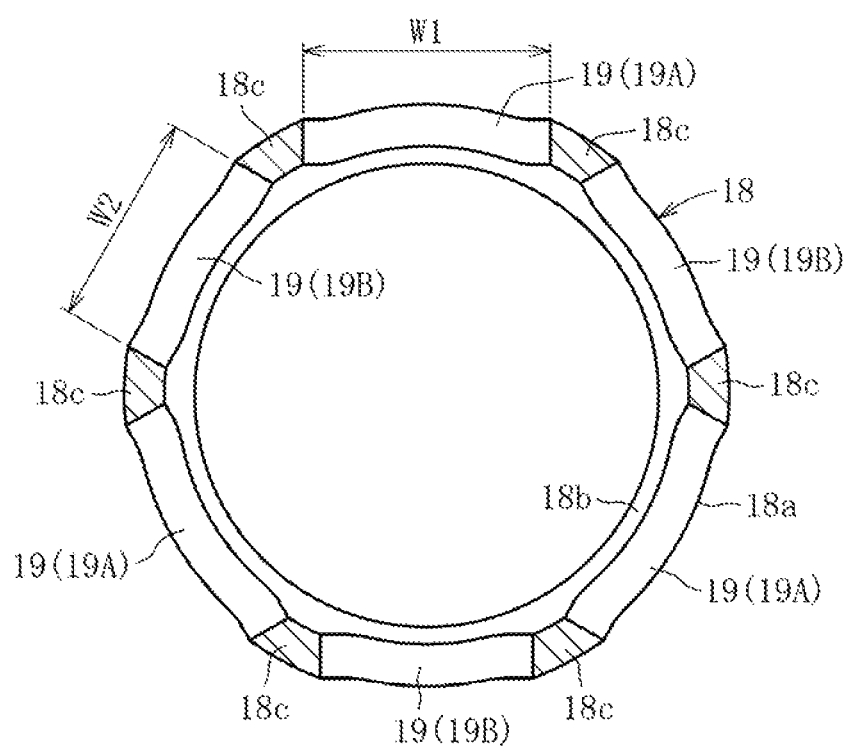
FIG. 13 is a transverse sectional view of the cage of the constant velocity universal joint in FIG. 1.

As illustrated in FIG. 10 to FIG. 13, the cage 18 is an annular member, and a plurality of pockets 19 configured to accommodate the balls 17 are arrayed in a peripheral wall of the cage 18 along a circumferential direction. Further, as illustrated in FIG. 1, a curvature center of an outer spherical surface 18a and a curvature center, of an inner spherical surface 18b match with the joint center O. In this case, as illustrated in FIG. 13, there are formed two types as the pockets 13, specifically, first pockets 19A corresponding to the tracks 20A, 20C, and 20E having a large crossing angle, and second pockets 19B corresponding to the tracks 20B, 20D, and 20F having a small crossing angle. In this case, when a circumferential length of each of the first pockets 19A is defined as W1, and a circumferential length of each of the second pockets 19B is defined as W2, a relationship of W1>W2 is satisfied.

Figure 29:
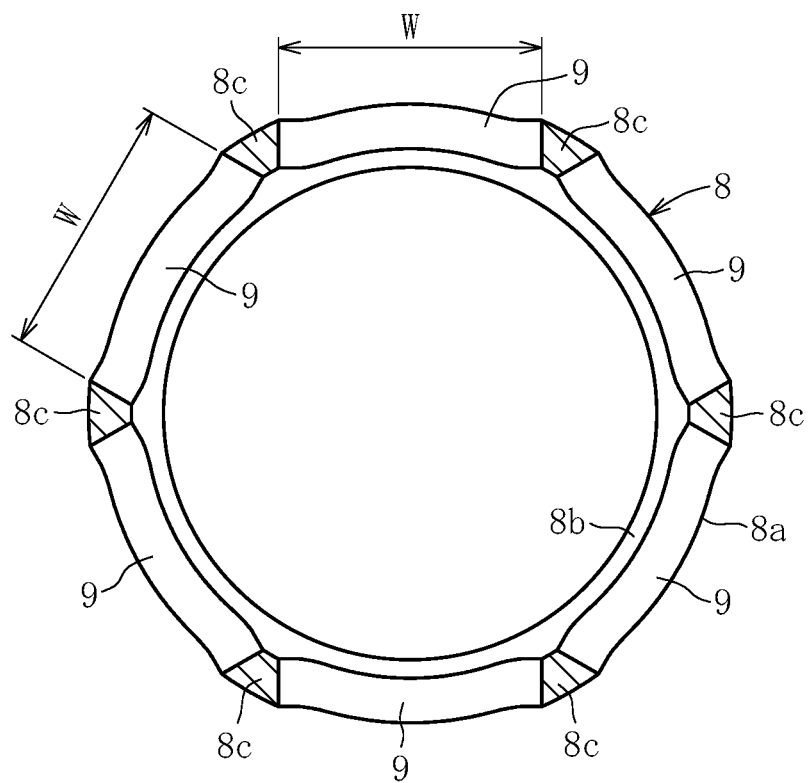
FIG. 29 is a sectional view of the cage of the constant velocity universal joint in FIG. 20.
Figure 30:
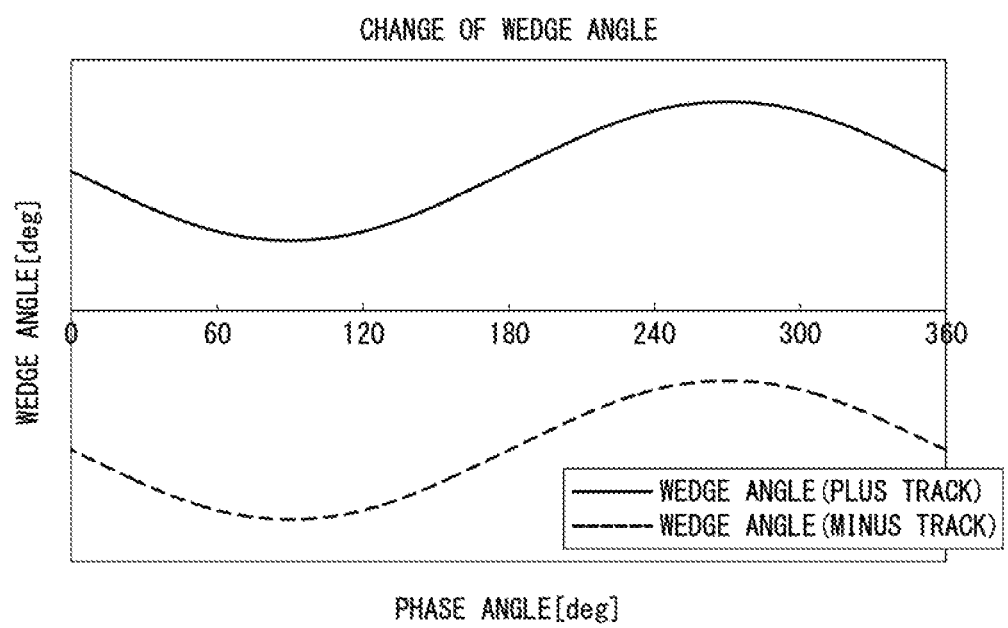
FIG. 30 is a graph for showing relationships between wedge angles and phase angles.
Figure 31:
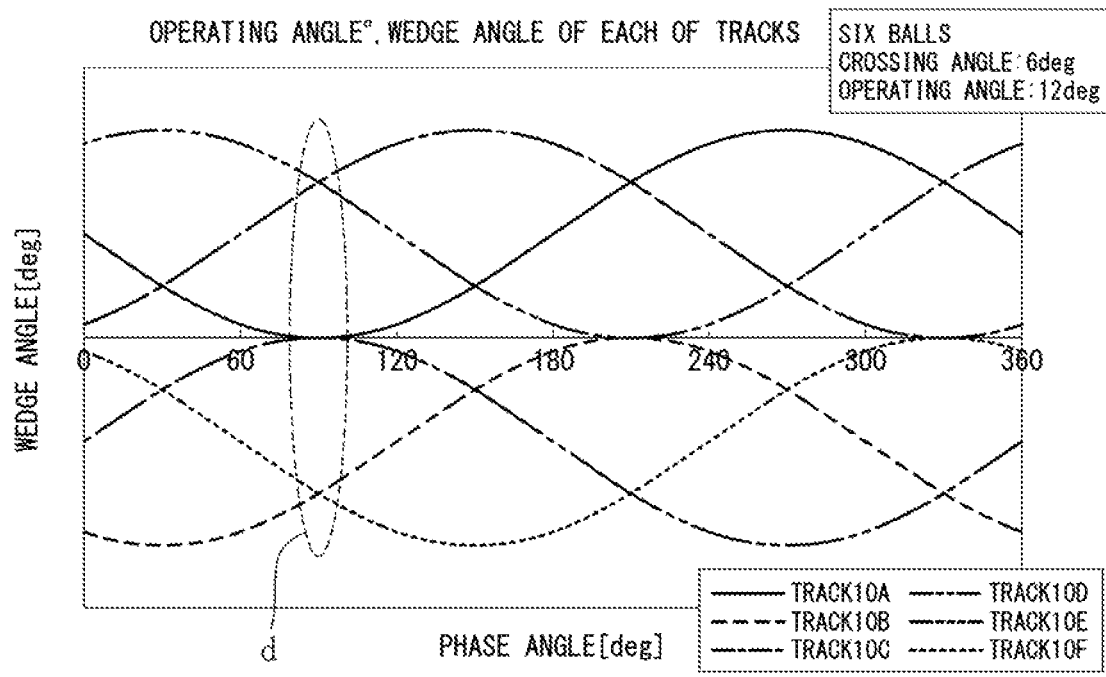
FIG. 31 is a graph for showing relationships between the wedge angles and the phase angles in six balls under a state in which a crossing angle is 6 degrees, and an operating angle is 24 degrees.
Figure 32:
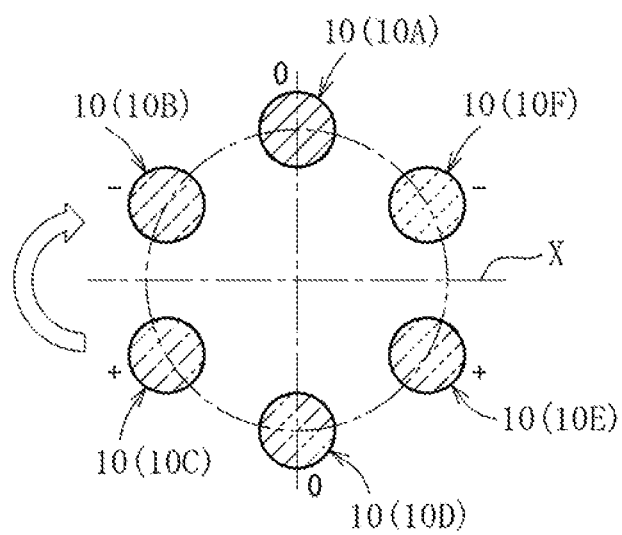
FIG. 32 is a view for illustrating a plus-and-minus relationship of the wedge angles in the "d" part in FIG. 31.
Figure 33:
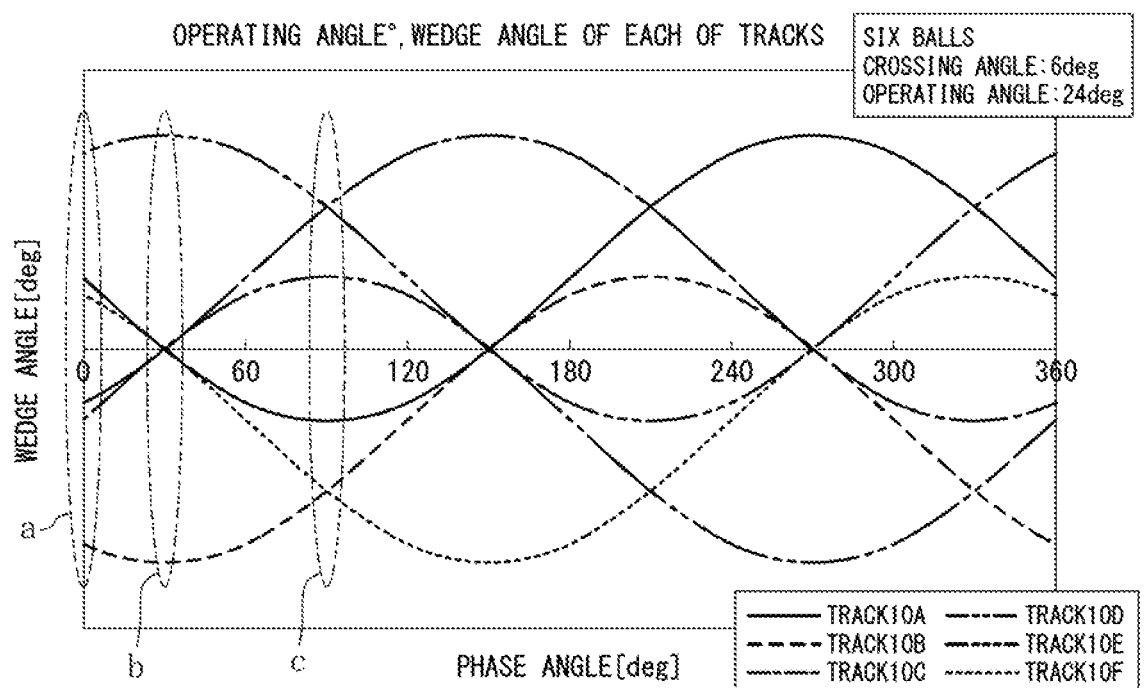
FIG. 33 is a graph for showing relationships between the wedge angles and the phase angles in six balls under a state in which the crossing angle is 6 degrees, and the operating angle is 24 degrees.
Figure 34A:
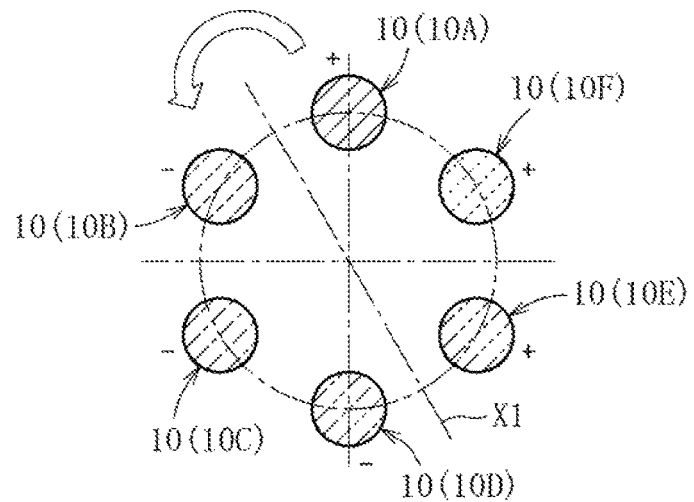
FIG. 34A is a view for illustrating a plus-and-minus relationship of the wedge angles in the "a" part in FIG. 33.
Figure 34B:
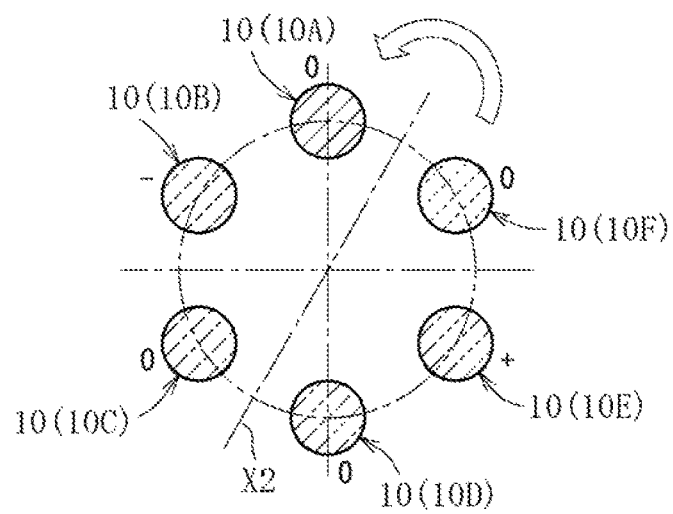
FIG. 34B is a view for illustrating a plus-and-minus relationship of the wedge angles in the "b" part in FIG. 33.
Figure 34C:
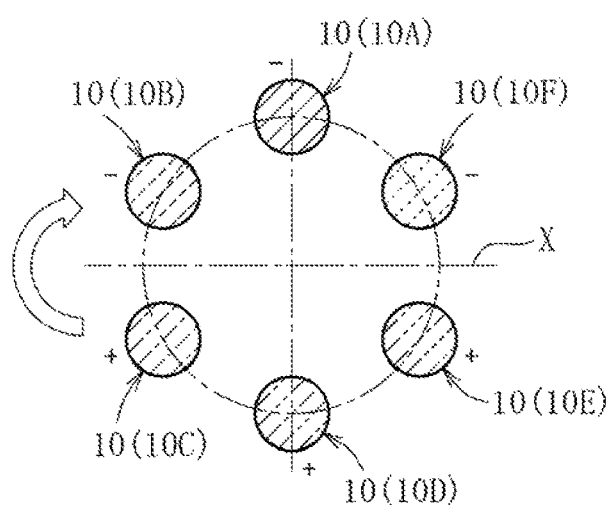
FIG. 34C is a view for illustrating a plus-and-minus relationship of the wedge angles in the "c" part in FIG. 33.
Figure 35:
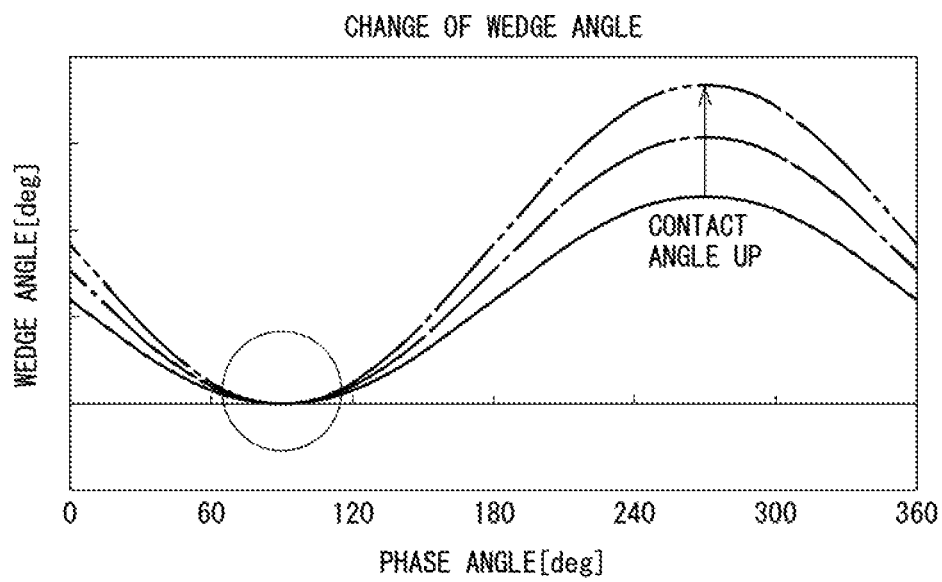
FIG. 35 is a graph for showing relationships between the wedge angles and the phase angles when the crossing angle is set to be constant and the contact angle is changed.
Figure 36:
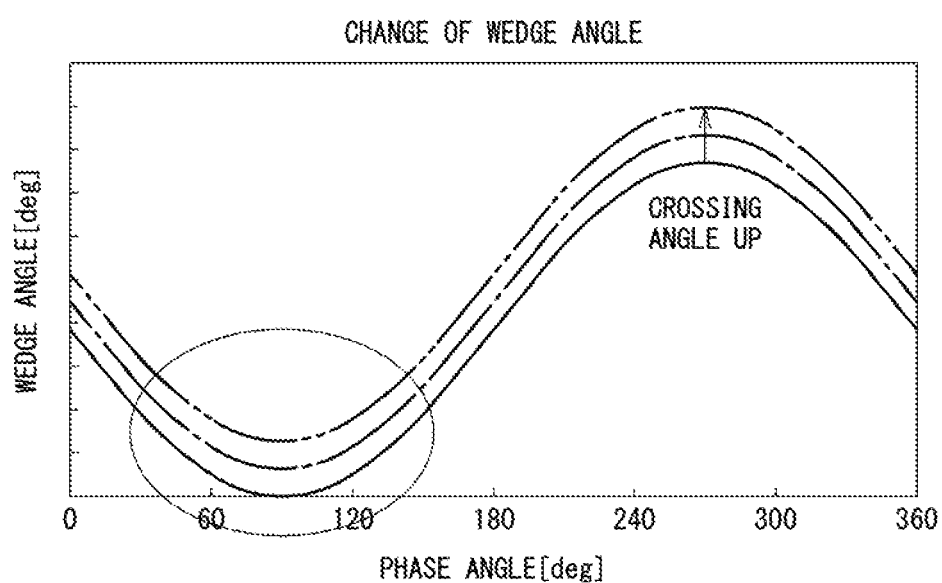
FIG. 36 is a graph for showing relationships between the wedge angles and the phase angles when the crossing angle is changed.
Figure 37A:
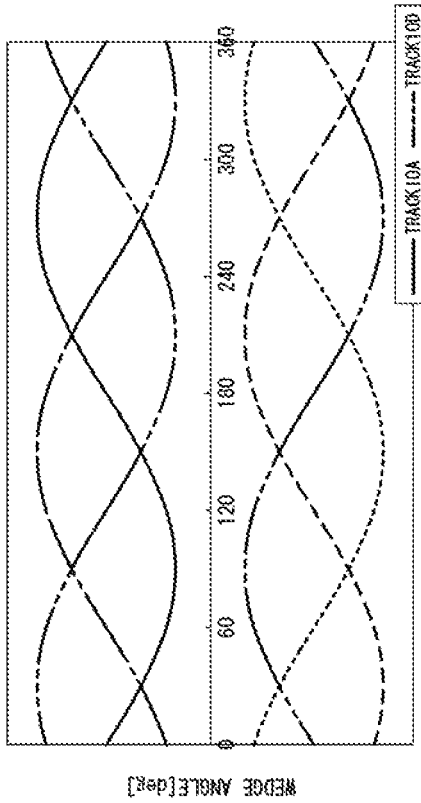
FIG. 37A is a graph for showing relationships between the wedge angles and the phase angles when the adjacent crossing angles are set to be the same, specifically, when reverse of the cage does not occur.
Figure 37C:
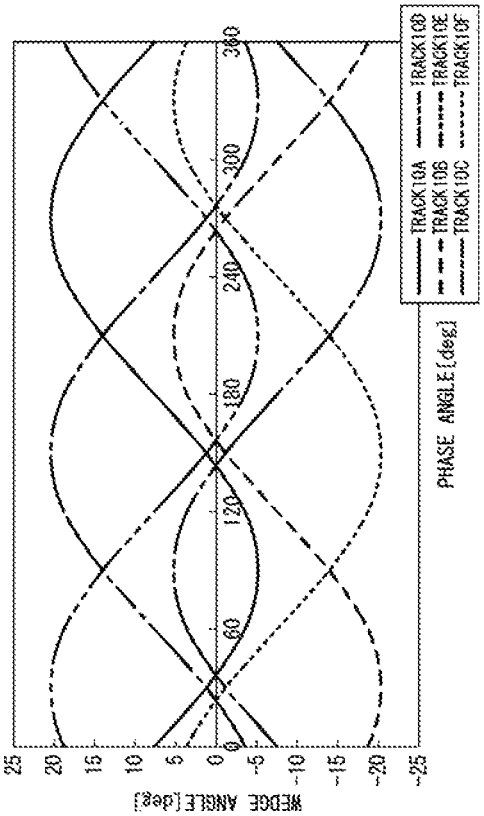
FIG. 37C is a graph for showing relationships between the wedge angles and the phase angles when the adjacent crossing angles are set to be the same, specifically, when reverse occurs in any phase angle.
Figure 37B:
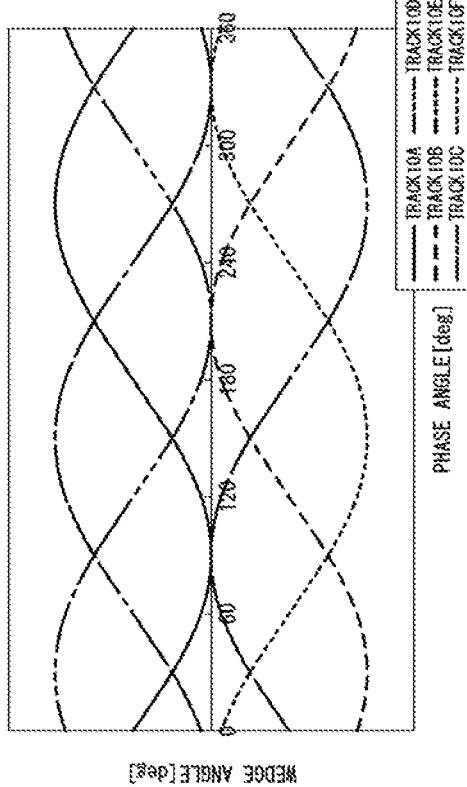
FIG. 37B is a graph for showing relationships between the wedge angles and the phase angles when the adjacent crossing angles are set to be the same, specifically, when reverse of the cage is beginning to occur.

In contrast, in a related-art cage 8 of a fixed type constant velocity universal joint having six-ball crossing tracks illustrated in FIG. 29, circumferential lengths W of the respective pockets 9 are the same. Therefore, a pillar width of a pillar portion 18c of the cage 18 illustrated in FIG. 13 can be set larger than a pillar width of a pillar portion 8c of the related-art cage 8 in FIG. 29.

Figure 14:
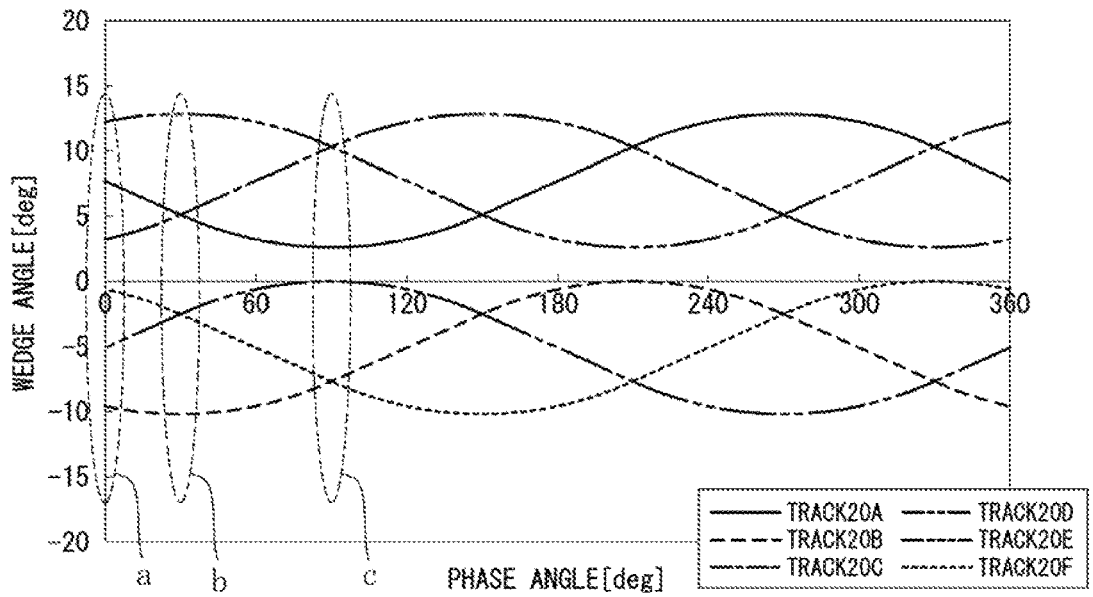
FIG. 14 is a graph for showing relationships between wedge angles and phase angles when a crossing angle γ1 is 6 degrees, a crossing angle γ2 is 4 degrees, and an operating angle θ is 8 degrees.
Figure 15A:
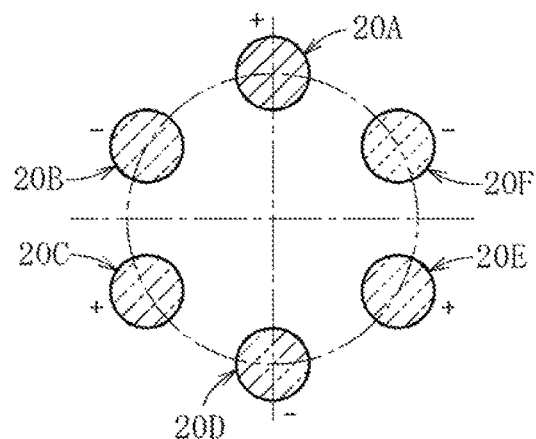
FIG. 15A is a view for illustrating a plus-and-minus relationship of the wedge angles in the "a" part in FIG. 14.
Figure 15B:
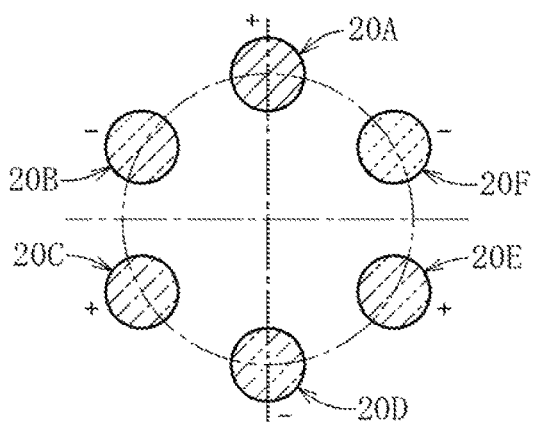
FIG. 15B is a view for illustrating a plus-and-minus relationship of the wedge angles in the "b" part in FIG. 14.
Figure 15C:
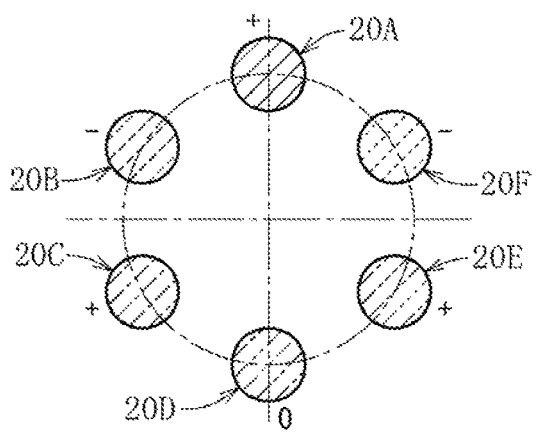
FIG. 15C is a view for illustrating a plus-and-minus relationship of the wedge angles in the "c" part in FIG. 14.

In the fixed type constant velocity universal joint having the configuration described above, in the respective ball tracks 20, phase angles and wedge angles have relationships as shown in FIG. 14. In FIG. 15A, "+" and "−" of the wedge angles of the respective tracks 20 in the "a" part in FIG. 14 are illustrated. In FIG. 15B, "+" and "−" of the wedge angles of the respective tracks 20 in the "b" part in FIG. 14 are illustrated. In FIG. 15C, "+" and "−" of the wedge angles of the respective tracks 20 in the "c" part in FIG. 14 are illustrated. In this case, the crossing angle γ1 is set to 6° (degrees), the crossing angle γ2 is set to 4° (degrees), and an operating angle θ is set to 8° (degrees).

That is, in FIG. 15A, the first ball track 20A, the third ball track 20C, and the fifth ball track 20E are "+", and the second ball track 20B, the fourth ball track 20D, and the sixth ball track 20F are "−". In FIG. 15B, the first ball track 20A, the third ball track 20C, and the fifth ball track 20E are "+", and the second ball track 20B, the fourth ball track 20D, and the sixth ball track 20F are "−". In FIG. 15C, the first ball track 20A, the third ball track 20C, and the fifth ball track 20E are "+", the second ball track 20B and the sixth ball track 20F are "−", and the fourth ball track 20D is "0".

Figure 16:
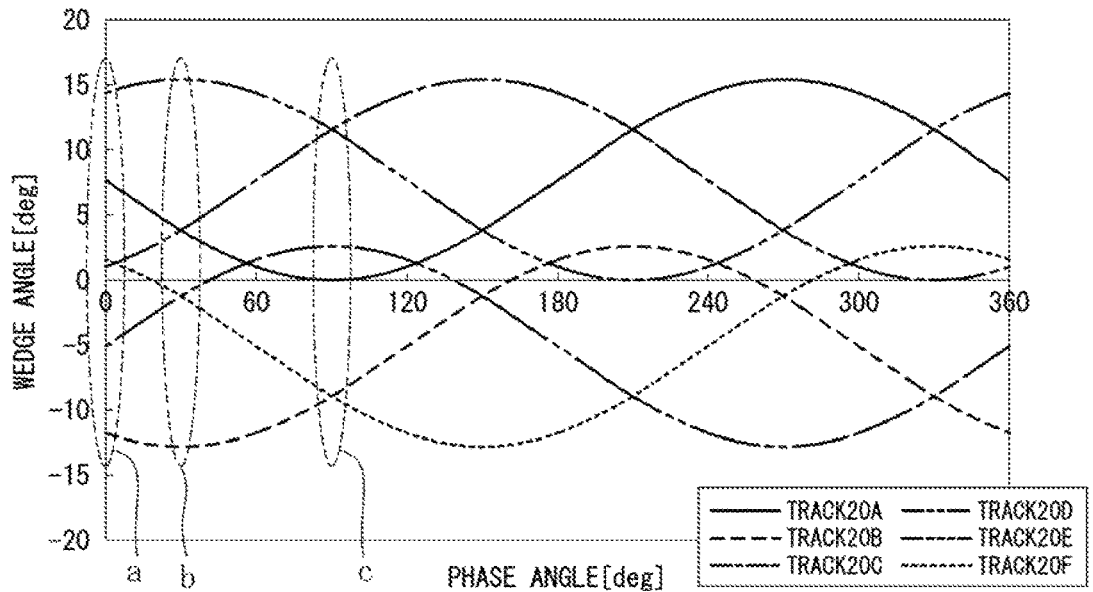
FIG. 16 is a graph for showing relationships between the wedge angles and the phase angles when the crossing angle γ1 is 6 degrees, the crossing angle γ2 is 4 degrees, and the operating angle θ is 12 degrees.
Figure 17A:
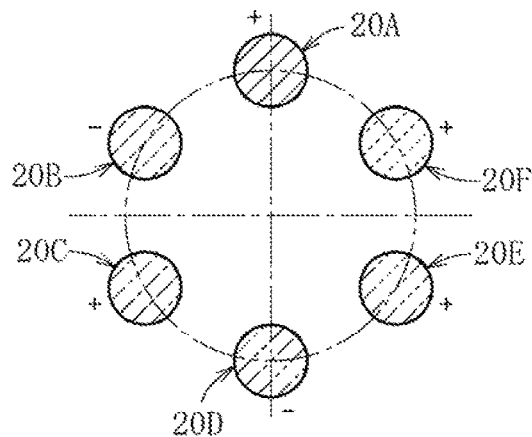
FIG. 17A is a view for illustrating a plus-and-minus relationship of the wedge angles in the "a" part in FIG. 16.
Figure 17B:
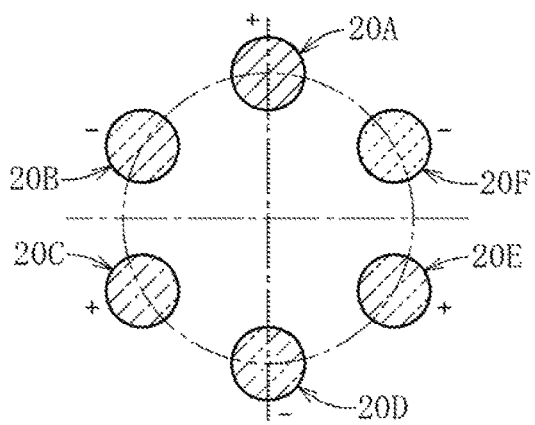
FIG. 17B is a view for illustrating a plus-and-minus relationship of the wedge angles in the "b" part in FIG. 16.
Figure 17C:
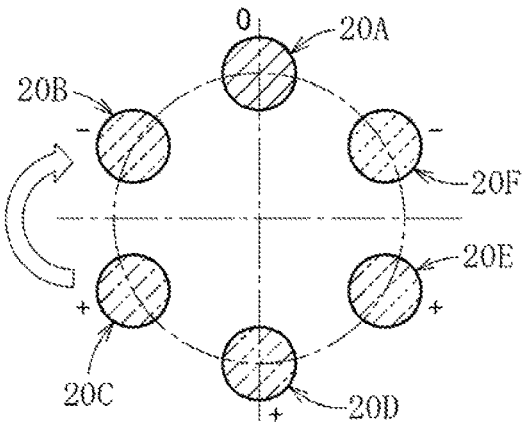
FIG. 17C is a view for illustrating a plus-and-minus relationship of the wedge angles in the "c" part in FIG. 16.

In FIG. 16, there are shown relationships between the phase angles and the wedge angles of the respective tracks 20 when the crossing angle γ1 is set to 6° (degrees), the crossing angle γ2 is set to 4° (degrees), and the operating angle θ is set to 12° (degrees). In FIG. 17A, "+" and "−" of the wedge angles of the respective tracks 20 in the "a" part in FIG. 16 are illustrated. In FIG. 17B, "+" and "−" of the wedge angles of the respective tracks 20 in the "b" part in FIG. 16 are illustrated. In FIG. 17C, "+" and "−" of the wedge angles of the respective tracks 20 in the "c" part in FIG. 16 are illustrated. In this case, the crossing angle γ1 is set to 6° (degrees), the crossing angle γ2 is set to 4° (degrees), and an operating angle θ is set to 8° (degrees).

In FIG. 17A, the first ball track 20A, the third ball track 20C, the fifth ball track 20E, and the sixth ball track 20F are "+", and the second ball track 20B and the fourth ball track 20D are "−". In FIG. 17B, the first ball track 20A, the third ball track 20C, and the fifth ball track 20F, are "+", and the second ball track 20B, the fourth ball track 20D, and the sixth ball track 20F are "−". In FIG. 17C, the first ball track 20A is "0", the third ball track 20C, the fourth ball track 20D, and the fifth ball track 20E are "+", and the second ball track 20B and the sixth ball track 20F are "−".

With the fixed type constant velocity universal joint according to the present invention, the track grooves 12 of the outer joint member 13 and the track grooves 15 of the inner joint member 16, which are opposed thereto, are inclined with respect to the axis line in the opposite directions, and the inclination angles of the torque transmitting ball tracks 20, which are adjacent to each other in the circumferential direction, are set to be different from each other. Thus, a spherical surface width F on a side of the inner joint member 16 on which the track grooves 15 are closely adjacent to each other (see FIG. 8) can be secured to be larger. Therefore, both of enhancement in strength and reduction in weight and size can be attained. Further, a maximum movement amount of the ball 17 differs among the pockets 19 of the cage 18, which are adjacent to each other in the circumferential direction. Thus, the circumferential length of the pillar portion between the pockets 19 adjacent to each other in the circumferential direction can be secured to be larger than in the case in which the inclination angles of the torque transmitting ball tracks 20, which are adjacent to each other in the circumferential direction, are the same. Therefore, the cage strength can be enhanced.

The ball 17 and each of the track grooves 12 and 15 are held in angular contact with each other at a contact angle of from 30° to 45°. Thus, the ball can be prevented from riding on a track groove edge portion when high torque is input so that sliding amounts of the ball and the track grooves can be reduced, thereby being capable of bringing the contact pressure into a satisfactory range.

In the above-mentioned embodiment, the curvature center O1 of the track groove 12 of the outer joint member 13 and the curvature center O2 of the track groove 15 of the inner joint member 16 match with each other without being offset in the radial direction. In contrast, in FIG. 18, a curvature center O5 of the track groove 12 of the outer joint member 13 is offset with respect to the joint center O in the radial direction, and in FIG. 19, a curvature center O6 of the track groove 15 of the inner joint member 16 is offset with respect to the joint center O in the radial direction.

Figure 18:
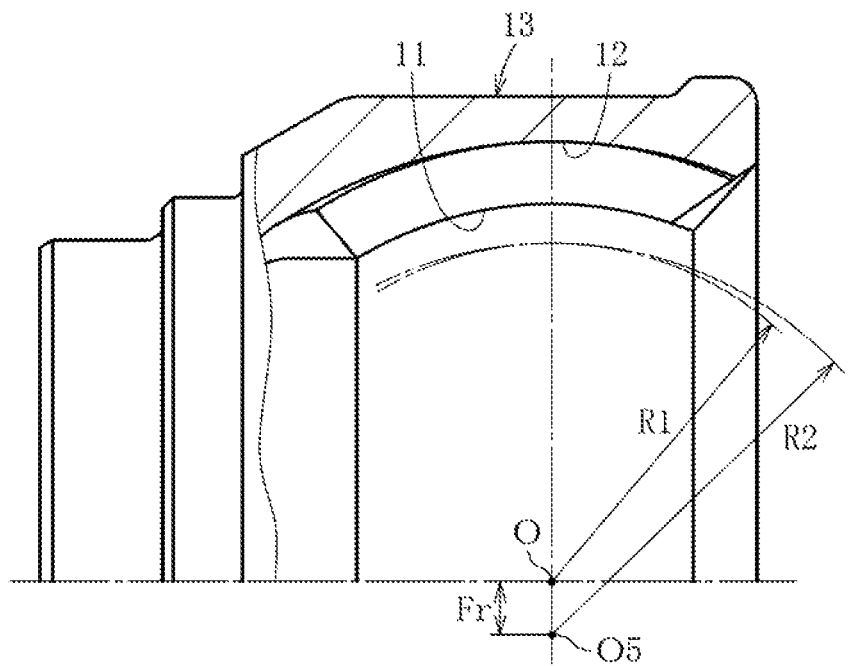
FIG. 18 is a main-part sectional view of the outer joint member.
Figure 19:
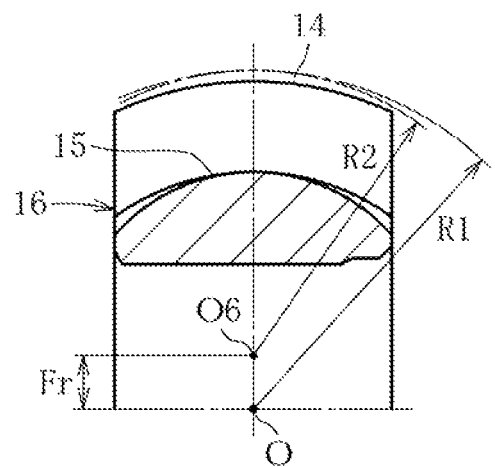
FIG. 19 is a main-part sectional view of the inner joint member.
Figure 20:
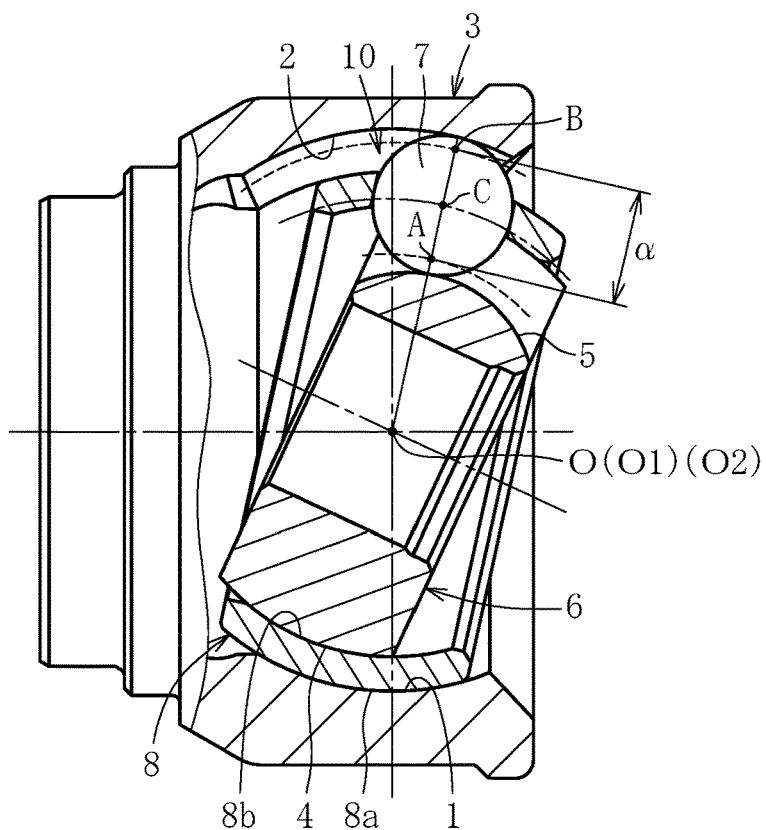
FIG. 20 is a sectional view of a related-art constant velocity universal joint.
Figure 21:
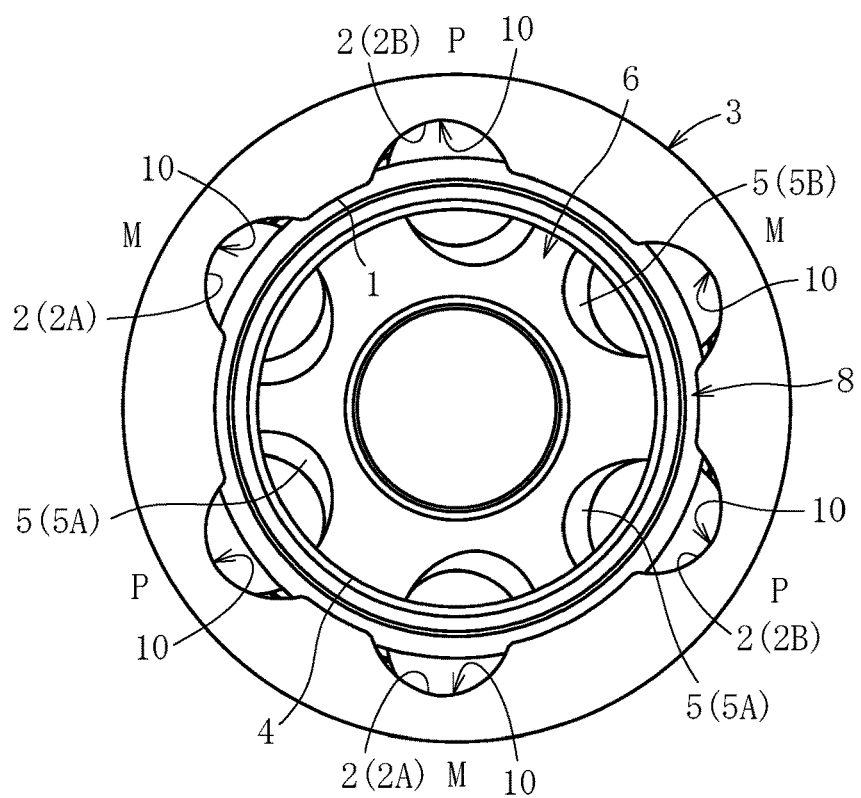
FIG. 21 is a front view of the constant velocity universal joint in FIG. 20.
Figure 22:
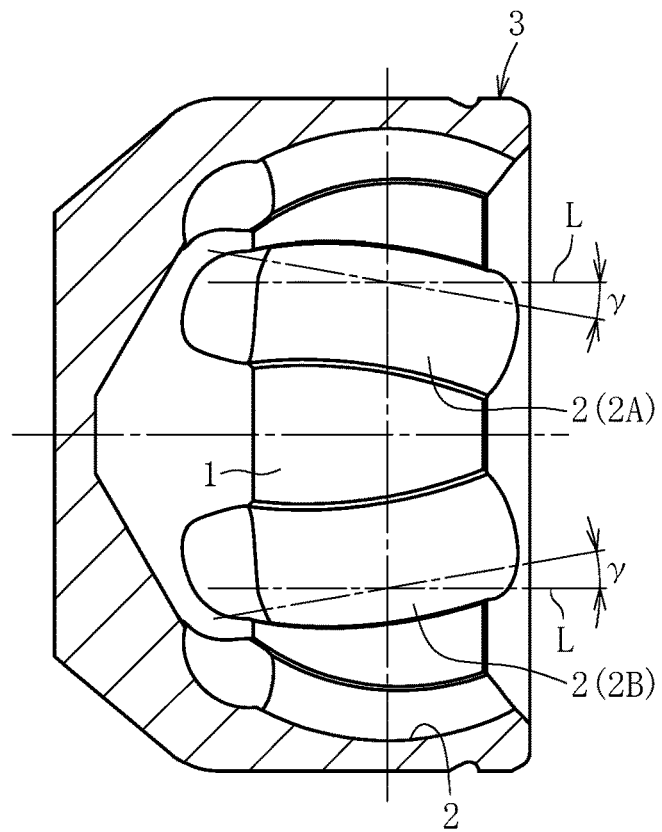
FIG. 22 is a sectional view of an outer joint member of the constant velocity universal joint in FIG. 20.
Figure 23:
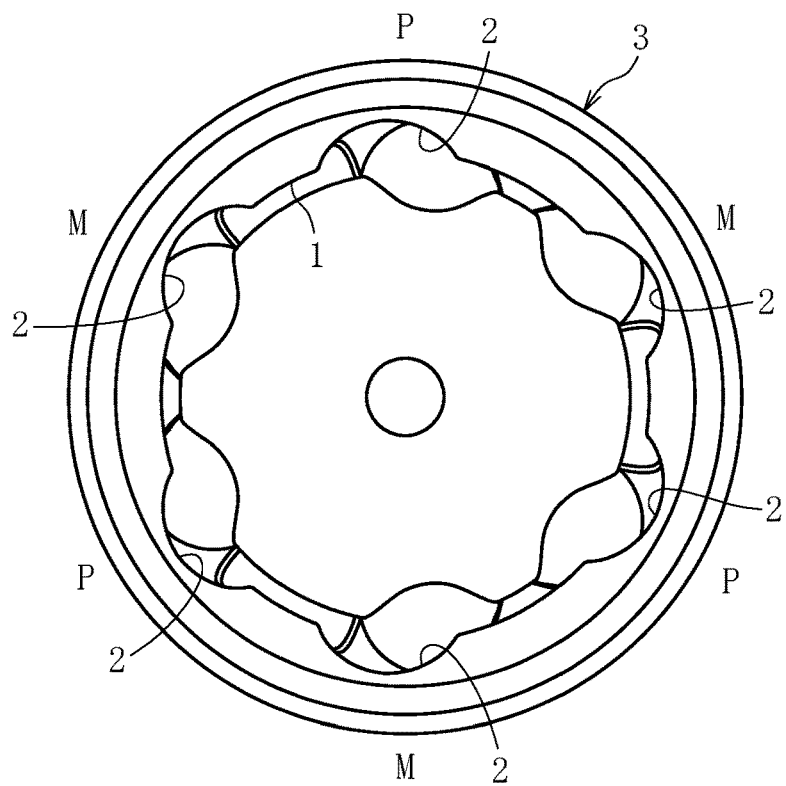
FIG. 23 is a front view of the outer joint member of the constant velocity universal joint in FIG. 20.
Figure 24:
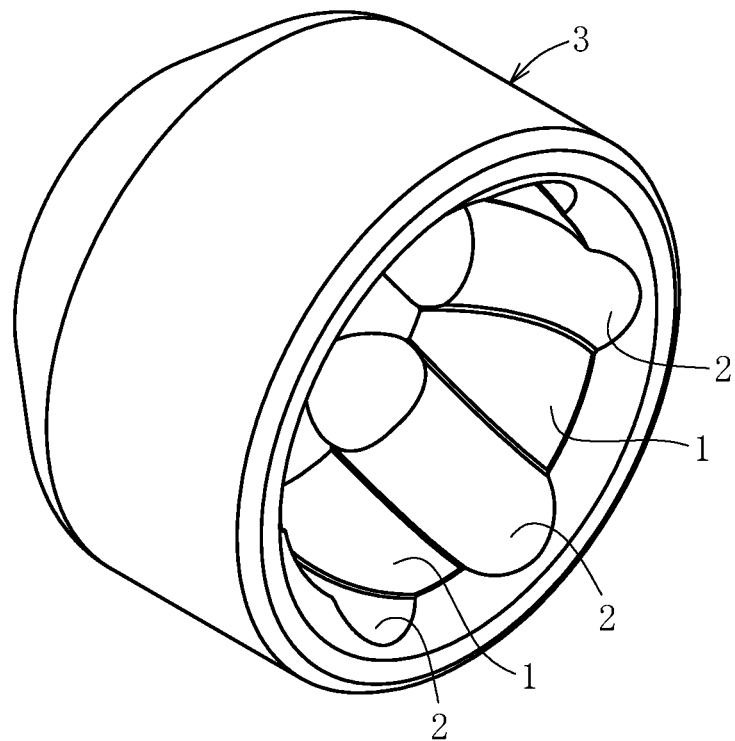
FIG. 24 is a perspective view of the outer joint member of the constant velocity universal joint in FIG. 20.
Figure 25:
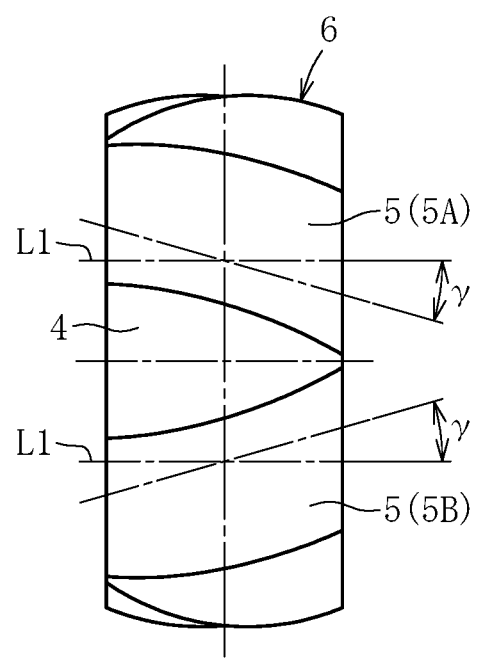
FIG. 25 is a side view of an inner joint member of the constant velocity universal joint in FIG. 20.
Figure 26:
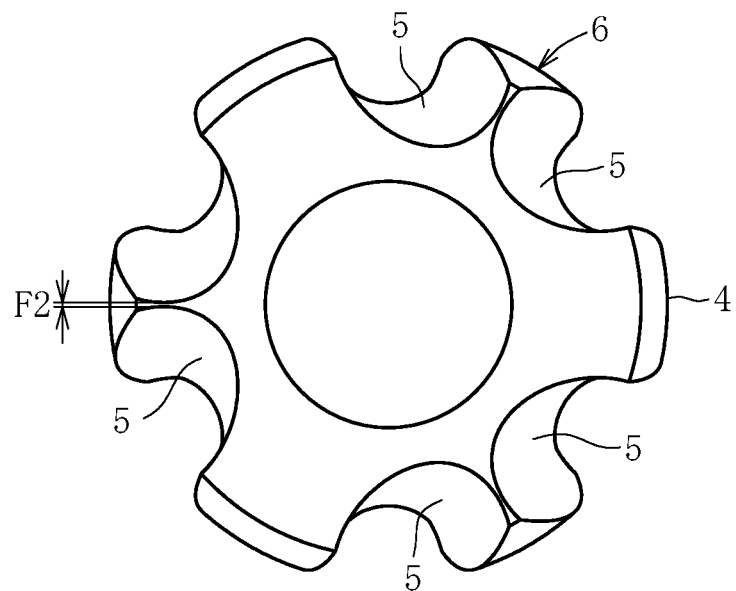
FIG. 26 is a front view of the inner joint member of the constant velocity universal joint in FIG. 20.
Figure 27:
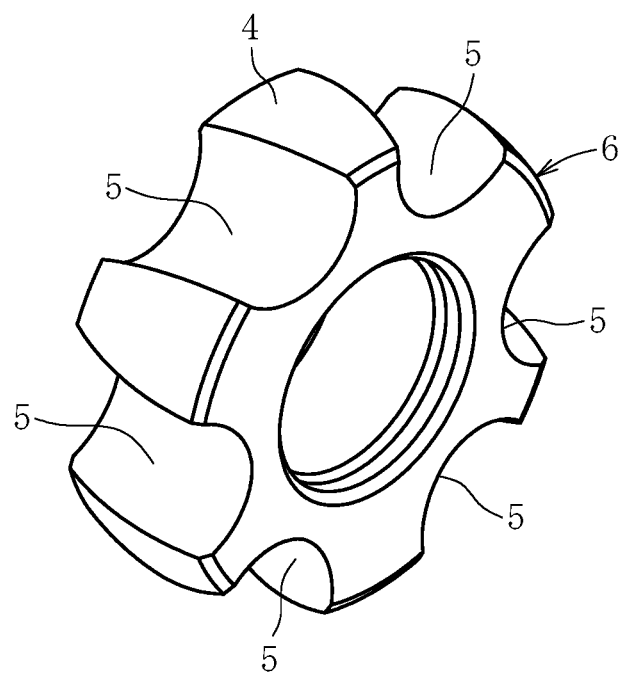
FIG. 27 is a perspective view of the inner joint member of the constant velocity universal joint in FIG. 20.
Figure 28:
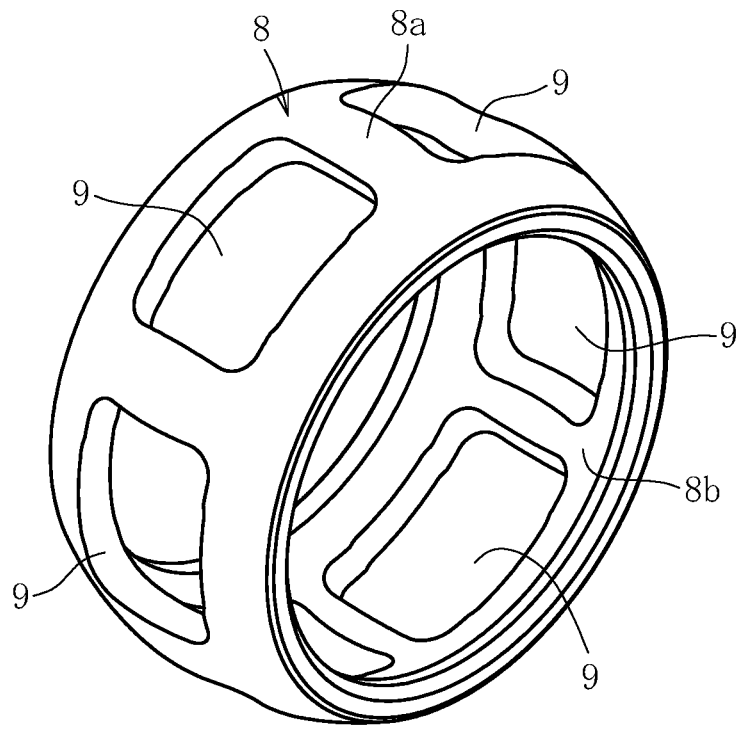
FIG. 28 is a perspective view of a cage of the constant velocity universal joint in FIG. 20.

When a groove depth of the track groove 12 of the outer joint member 13 is to be secured, as illustrated in FIG. 18, the curvature center O5 of the track groove 12 of the outer joint member 13 is offset in a negative direction in the radial direction. When a groove depth of the track groove 15 of the inner joint member 16 is to be secured, as illustrated in FIG. 19, the curvature center O6 of the track groove 15 of the inner joint member 16 is offset in a positive direction in the radial direction. In FIG. 18 and FIG. 19, R2 indicates a center raceway of the ball 17 when the track center is offset with respect to the spherical surface center by Fr in the radial direction.

The track center is offset in the radial direction as described above so that the groove depths of the track grooves 12 and 15 can be varied. Therefore, there can be obtained a structure capable of preventing the balls 17 from dropping off the track grooves 12 and 15, or a structure capable of enhancing the stiffness of the outer joint member 13 and the inner joint member 16.

Even when the inclination angles of the torque transmitting ball tracks 20, which are adjacent to each other in the circumferential direction, are different from each other as in the invention of the present application, a limiting angle for stably operating a constant velocity universal joint depends on a crossing angle on a side on which the inclination angle is larger. Therefore, the constant velocity universal joint according to the present invention can take the same operating angle as that of a normal constant velocity universal joint having a six-ball crossing tracks, in which inclination angles of the torque transmitting ball tracks adjacent to each other in the circumferential direction are the same. That is, the inclination angle can be secured to be larger than that of a type in which the inclination angles of the tracks adjacent to each other are the same. Thus, the limiting angle for stably operating the constant velocity universal joint can be larger (a large operating angle can be formed).

In consideration of a maximum operating angle of a propeller shaft or a drive shaft for a rear wheel, the crossing angle γ1 is set to be larger, than the limiting operating angle by 8° or more. The crossing angle γ2 can be set to satisfy a relationship of γ2≤γ1. However, when the crossing angle γ2 is 4° or less, a force in a pocket direction which, may be generated in the track (a component force of a track load) becomes extremely smaller in an angle range in a normal use (an angle of the constant velocity universal joint in normal traveling), with the result that a balance of a force that acts on the cage is degraded. Therefore, it is preferred that the crossing angle γ2 be set to 4° or more.

With regard to the description of the embodiment of the present invention, the present invention is not limited to the embodiment described above, and various modifications may be made thereto. For example, when the radial offset is provided, an amount of the radial offset can be suitably set as far as the load capacities of the track grooves 12 and 15 of the outer joint member 13 and the inner joint member 16 can be increased, or the thickness of the bottom portion of each of the track grooves 12 and 15 can be increased.

INDUSTRIAL APPLICABILITY

The fixed type constant velocity universal joint according to the present invention is applicable not only to a drive shaft, a propeller shaft, and the like, but also to power transmission systems of various other industrial machines.

REFERENCE SIGNS LIST 11 inner spherical surface
12, 15 track groove
13 outer joint member
14 outer spherical surface
16 inner joint member
17 ball
18 cage
18a outer spherical surface
18b inner spherical surface
20 torque transmitting ball track

The invention claimed is:
1. A fixed type constant velocity universal joint comprising:

an outer joint member having a plurality of track grooves formed in an inner spherical surface thereof;
an inner joint member having a plurality of track grooves, which are paired with the track grooves of the outer joint member, formed in an outer spherical surface thereof;
a plurality of torque transmission balls, which are arrayed in a plurality of torque transmitting ball tracks that are each formed by one of the track grooves of the outer joint member and a corresponding one of the track grooves of the inner joint member; and
a cage, which is interposed between the inner spherical surface of the outer joint member and the outer spherical surface of the inner joint member, and is configured to retain the plurality of torque transmission balls,
wherein the plurality of torque transmitting ball tracks comprise six torque transmitting ball tracks, which are defined as a first track, a second track, a third track, a fourth track, a fifth track, and a sixth track along a circumferential direction,
wherein an axial offset amount of a curvature center of each of the plurality of track grooves of the outer joint member and an axial offset amount of a curvature center of each of the plurality of track grooves of the inner joint member is set to 0,
wherein the plurality of track grooves of the outer joint member and the plurality of track grooves of the inner joint member are each inclined with respect to an axis line, and
wherein, in each of the plurality of torque transmitting ball tracks, the one of the plurality of track grooves of the outer joint member and the corresponding one of the plurality of track grooves of the inner joint member, which are opposed to each other, are inclined with respect to the axis line in opposite directions so that inclination angles of the plurality of torque transmitting ball tracks adjacent to each other in the circumferential direction are set to be different from each other, by which a spherical surface width on a side of the inner joint member on which the track grooves are closely adjacent to each other is larger as compared to a configuration in which the inclination angles are not set to be different from each other.

2. The fixed type constant velocity universal joint according to claim 1,
wherein the curvature center of each of the plurality of track grooves of the outer joint member is offset with respect to a curvature center of the inner spherical surface of the outer joint member in a radial direction, and
wherein the curvature center of each of the plurality of track grooves of the inner joint member is offset with respect to a curvature center of the outer spherical surface of the inner joint member in the radial direction.

3. A fixed type constant velocity universal joint comprising:
an outer joint member having a plurality of track grooves formed in an inner spherical surface thereof;
an inner joint member having a plurality of track grooves, which are paired with the track grooves of the outer joint member, formed in an outer spherical surface thereof;
a plurality of torque transmission balls, which are arrayed in a plurality of torque transmitting ball tracks that are each formed by one of the track grooves of the outer joint member and a corresponding one of the track grooves of the inner joint member; and
a cage, which is interposed between the inner spherical surface of the outer joint member and the outer spherical surface of the inner joint member, and is configured to retain the plurality of torque transmission balls,
wherein the plurality of torque transmitting ball tracks comprise six torque transmitting ball tracks, which are defined as a first track, a second track, a third track, a fourth track, a fifth track, and a sixth track along a circumferential direction,
wherein an axial offset amount of a curvature center of each of the plurality of track grooves of the outer joint member and an axial offset amount of a curvature center of each of the plurality of track grooves of the inner joint member is set to 0,
wherein the plurality of track grooves of the outer joint member and the plurality of track grooves of the inner joint member are each inclined with respect to an axis line,
wherein, in each of the plurality of torque transmitting ball tracks, the one of the plurality of track grooves of the outer joint member and the corresponding one of the plurality of track grooves of the inner joint member, which are opposed to each other, are inclined with respect to the axis line in opposite directions so that inclination angles of the plurality of torque transmitting ball tracks adjacent to each other in the circumferential direction are set to be different from each other, and
wherein, when crossing angles being the inclination angles of the first track, the third track, and the fifth track are set to be the same and are each defined as $\gamma 1$, and crossing angles being the inclination angles of the second track, the fourth track, and the sixth track are set to be the same and are each defined as $\gamma 2$, a relationship of $\gamma 1 > \gamma 2$ is satisfied.

4. The fixed type constant velocity universal joint according to claim 3, wherein the crossing angle $\gamma 1$ of each of the first track, the third track, and the fifth track is set to satisfy a relationship of $8° \leq \gamma 1 \leq 20°$.

5. The fixed type constant velocity universal joint according to claim 4, wherein the crossing angle $\gamma 1$ of each of the first track, the third track, and the fifth track, and the crossing angle $\gamma 2$ of each of the second track, the fourth track, and the sixth track are set to satisfy a relationship of $4° \leq \gamma 2 \leq \gamma 1$.

6. The fixed type constant velocity universal joint according to claim 4, wherein each of the plurality of torque transmitting balls and each of the plurality of track grooves of the inner and outer joint members are held in angular contact with each other at a contact angle of from 30° to 45°.

7. The fixed type constant velocity universal joint according to claim 4,
wherein the curvature center of each of the plurality of track grooves of the outer joint member is offset with respect to a curvature center of the inner spherical surface of the outer joint member in a radial direction, and
wherein the curvature center of each of the plurality of track grooves of the inner joint member is offset with respect to a curvature center of the outer spherical surface of the inner joint member in the radial direction.

8. The fixed type constant velocity universal joint according to claim 3, wherein the crossing angle $\gamma 1$ of each of the first track, the third track, and the fifth track, and the crossing angle $\gamma 2$ of each of the second track, the fourth track, and the sixth track are set to satisfy a relationship of $4° \leq \gamma 2 \leq \gamma 1$.

9. The fixed type constant velocity universal joint according claim 8, wherein each of the plurality of torque transmitting balls and each of the plurality of track grooves of the inner and outer joint members are held in angular contact with each other at a contact angle of from 30° to 45°.

10. The fixed type constant velocity universal joint according to claim 8,
wherein the curvature center of each of the plurality of track grooves of the outer joint member is offset with respect to a curvature center of the inner spherical surface of the outer joint member in a radial direction, and
wherein the curvature center of each of the plurality of track grooves of the inner joint member is offset with respect to a curvature center of the outer spherical surface of the inner joint member in the radial direction.

11. The fixed type constant velocity universal joint according claim 3, wherein each of the plurality of torque transmitting balls and each of the plurality of track grooves of the inner and outer joint members are held in angular contact with each other at a contact angle of from 30° to 45°.

12. The fixed type constant velocity universal joint according to claim 3,
wherein the curvature center of each of the plurality of track grooves of the outer joint member is offset with respect to a curvature center of the inner spherical surface of the outer joint member in a radial direction, and
wherein the curvature center of each of the plurality of track grooves of the inner joint member is offset with respect to a curvature center of the outer spherical surface of the inner joint member in the radial direction.

13. A fixed type constant velocity universal joint comprising:
an outer joint member having a plurality of track grooves formed in an inner spherical surface thereof;
an inner joint member having a plurality of track grooves, which are paired with the track grooves of the outer joint member, formed in an outer spherical surface thereof;
a plurality of torque transmission balls, which are arrayed in a plurality of torque transmitting ball tracks that are each formed by one of the track grooves of the outer joint member and a corresponding one of the track grooves of the inner joint member; and
a cage, which is interposed between the inner spherical surface of the outer joint member and the outer spherical surface of the inner joint member, and is configured to retain the plurality of torque transmission balls,
wherein the plurality of torque transmitting ball tracks comprise six torque transmitting ball tracks, which are defined as a first track, a second track, a third track, a fourth track, a fifth track, and a sixth track along a circumferential direction,
wherein an axial offset amount of a curvature center of each of the plurality of track grooves of the outer joint member and an axial offset amount of a curvature center of each of the plurality of track grooves of the inner joint member is set to 0,
wherein the plurality of track grooves of the outer joint member and the plurality of track grooves of the inner joint member are each inclined with respect to an axis line,
wherein, in each of the plurality of torque transmitting ball tracks, the one of the plurality of track grooves of the outer joint member and the corresponding one of the plurality of track grooves of the inner joint member, which are opposed to each other, are inclined with respect to the axis line in opposite directions so that inclination angles of the plurality of torque transmitting ball tracks adjacent to each other in the circumferential direction are set to be different from each other, and
wherein each of the plurality of torque transmitting balls and each of the plurality of track grooves of the inner and outer joint members are held in angular contact with each other at a contact angle of from 30° to 45°.

14. The fixed type constant velocity universal joint according to claim 13,
wherein the curvature center of each of the plurality of track grooves of the outer joint member is offset with respect to a curvature center of the inner spherical surface of the outer joint member in a radial direction, and
wherein the curvature center of each of the plurality of track grooves of the inner joint member is offset with respect to a curvature center of the outer spherical surface of the inner joint member in the radial direction.

* * * * *